US011779892B2

(12) United States Patent
Santrach et al.

(10) Patent No.: US 11,779,892 B2
(45) Date of Patent: Oct. 10, 2023

(54) PAINT STORAGE AND MIXING SYSTEM

(71) Applicant: X-PERT Paint Mixing Systems, Inc., Roseville, MN (US)

(72) Inventors: Peter Santrach, North Oaks, MN (US); Bruce Funk, Maplewood, MN (US); Barry Hines, Centerville, MN (US); Christopher Herman, White Bear Lake, MN (US)

(73) Assignee: X-Pert Paint Mixing Systems, Inc., Roseville, MN (US)

( * ) Notice: Subject to any disclaimer, the term of this patent is extended or adjusted under 35 U.S.C. 154(b) by 0 days.

(21) Appl. No.: 14/516,395

(22) Filed: Oct. 16, 2014

(65) Prior Publication Data

US 2015/0103621 A1   Apr. 16, 2015

Related U.S. Application Data

(60) Provisional application No. 61/891,703, filed on Oct. 16, 2013.

(51) Int. Cl.
*B01F 29/322* (2022.01)
*B01F 35/75* (2022.01)
(Continued)

(52) U.S. Cl.
CPC ............ *B01F 35/754* (2022.01); *B01F 23/50* (2022.01); *B01F 29/30* (2022.01); *B01F 29/31* (2022.01); *B01F 29/322* (2022.01); *B01F 31/23* (2022.01); *B01F 33/848* (2022.01); *B01F 35/712* (2022.01); *B01F 35/881* (2022.01); *B01F 35/883* (2022.01); *B44D 3/08* (2013.01); *B65D 83/0055* (2013.01); *B65D 83/62* (2013.01); *B67D 7/0255* (2013.01); *B67D 7/36* (2013.01); *B01F 2101/30* (2022.01); *B05B 9/047* (2013.01); *B67D 7/84* (2013.01); *F16K 31/0675* (2013.01);
(Continued)

(58) Field of Classification Search
CPC ............................. B01F 9/0016; B01F 29/322
USPC .................................. 366/213, 214, 220, 235
See application file for complete search history.

(56) References Cited

U.S. PATENT DOCUMENTS 423,362 A * 3/1890 Wells ..................... B01F 9/0021
  366/214
449,665 A * 4/1891 Camp ..................... B01F 9/0021
  366/214
(Continued)

FOREIGN PATENT DOCUMENTS

DE  9417421   2/1995
DE  10227105  1/2004
(Continued)

OTHER PUBLICATIONS

Partial International Search Report for PCT/US2014/060965 dated Dec. 23, 2014.
(Continued)

*Primary Examiner* — David L Sorkin
(74) *Attorney, Agent, or Firm* — Dicke, Billig & Czaja, PLLC

(57) ABSTRACT

A novel canister storage system, mixing system, canister assembly, dispensing system, and tracking system. In one or more embodiments, the systems are used for storing, mixing and dispensing fluids. In one application, the fluid includes one or more paint toners.

10 Claims, 34 Drawing Sheets

(51) Int. Cl.
*B67D 7/02* (2010.01)
*B65D 83/62* (2006.01)
*B65D 83/00* (2006.01)
*B44D 3/08* (2006.01)
*B01F 23/50* (2022.01)
*B01F 29/30* (2022.01)
*B01F 29/31* (2022.01)
*B01F 31/23* (2022.01)
*B01F 33/84* (2022.01)
*B01F 35/71* (2022.01)
*B01F 35/88* (2022.01)
*B67D 7/36* (2010.01)
*H01F 7/06* (2006.01)
*F16K 31/06* (2006.01)
*B67D 7/84* (2010.01)
*H01F 5/00* (2006.01)
*B05B 9/047* (2006.01)
*B01F 101/30* (2022.01)

(52) U.S. Cl.
CPC ............... *H01F 5/00* (2013.01); *H01F 5/003* (2013.01); *H01F 7/06* (2013.01); *H01F 7/064* (2013.01)

(56) References Cited

U.S. PATENT DOCUMENTS

| | | | | |
|---|---|---|---|---|
| 493,046 | A * | 3/1893 | Shumway | B01F 9/0021 366/214 |
| 516,947 | A * | 3/1894 | Stidham | B01F 9/0021 366/214 |
| 521,013 | A * | 6/1894 | Butler | B01F 9/0021 165/89 |
| 621,563 | A * | 3/1899 | Gilbert | B01F 9/0021 165/89 |
| 2,110,970 | A * | 3/1938 | Cravaritis | A47J 43/27 366/213 |
| 2,131,662 | A | 9/1938 | Holmes | |
| 3,074,597 | A | 1/1963 | Felts et al. | |
| 3,198,438 | A | 8/1965 | Hultgren | |
| 3,270,920 | A | 9/1966 | Nessler | |
| 3,920,149 | A | 11/1975 | Fortino et al. | |
| 3,993,218 | A | 11/1976 | Reichenberger | |
| 4,124,146 | A | 11/1978 | Sealfon | |
| 4,329,068 | A * | 5/1982 | Neuner | B01F 9/0021 366/214 |
| 5,054,687 | A | 10/1991 | Burns | |
| 5,060,826 | A | 10/1991 | Coleman | |
| 5,133,482 | A | 7/1992 | Burrows et al. | |
| 5,322,358 | A * | 6/1994 | Coho | B01F 9/002 366/214 |
| 5,443,298 | A | 8/1995 | Finley | |
| 5,445,195 | A | 8/1995 | Kim | |
| 5,485,941 | A | 1/1996 | Guyomard | |
| 5,871,119 | A | 2/1999 | Blackington | |
| 6,234,218 | B1 | 5/2001 | Boers | |
| 6,953,155 | B2 | 10/2005 | Joseph | |
| 7,018,587 | B2 * | 3/2006 | Heath | B01L 3/50825 211/60.1 |
| 7,156,045 | B2 | 1/2007 | Ueno | |
| 7,308,991 | B2 | 12/2007 | Alberg | |
| 7,753,239 | B2 | 7/2010 | Chang | |
| 7,766,250 | B2 | 8/2010 | Kosmyna | |
| 7,878,425 | B2 | 2/2011 | Handzel | |
| 7,918,369 | B2 | 4/2011 | Kosmyna | |
| 7,931,171 | B2 | 4/2011 | Hamamura | |
| 8,464,908 | B1 | 6/2013 | Tabor | |
| 8,544,686 | B2 | 10/2013 | Williams | |
| 8,753,598 | B2 | 6/2014 | Andersen | |
| 8,899,447 | B2 | 12/2014 | Chassaing | |
| 2003/0148050 | A1 | 8/2003 | Taniguchi | |
| 2004/0262558 | A1 | 12/2004 | Wilson | |
| 2006/0000838 | A1 | 1/2006 | Santrach | |
| 2007/0235471 | A1 | 10/2007 | Radermacher | |
| 2008/0251478 | A1 * | 10/2008 | Jaskowski | C12H 1/22 211/74 |
| 2010/0108723 | A1 | 5/2010 | Chassaing | |
| 2011/0006076 | A1 | 1/2011 | Williams | |
| 2011/0101028 | A1 | 5/2011 | Chassaing | |
| 2011/0108577 | A1 | 5/2011 | Chassaing | |
| 2011/0148597 | A1 | 6/2011 | Reif et al. | |
| 2012/0163117 | A1 | 6/2012 | Guidry, Jr. et al. | |
| 2013/0284766 | A1 | 10/2013 | Dubois | |
| 2015/0023129 | A1 * | 1/2015 | Krzywdziak | B01F 9/0016 366/198 |
| 2015/0102059 | A1 | 4/2015 | Santrach | |

FOREIGN PATENT DOCUMENTS

| | | |
|---|---|---|
| EP | 0283137 | 2/1988 |
| EP | 0517172 | 12/1992 |
| EP | 1975486 | 10/2008 |
| EP | 2 135 668 | 12/2009 |
| EP | 2 251 093 | 11/2010 |
| FR | 2983089 | 5/2013 |
| GB | 1257608 | 12/1971 |
| WO | 2003/026458 | 4/2003 |
| WO | 2006/027450 | 3/2006 |
| WO | 2012/080667 | 6/2012 |

OTHER PUBLICATIONS

International Search Report for PCT/US2014/060970 dated Feb. 3, 2015.
International Search Report for PCT/US2014/060967 dated Feb. 3, 2015.
European Office Action dated Sep. 20, 2017 in parallel EP Application No. 14 790 964.2-1731.

* cited by examiner

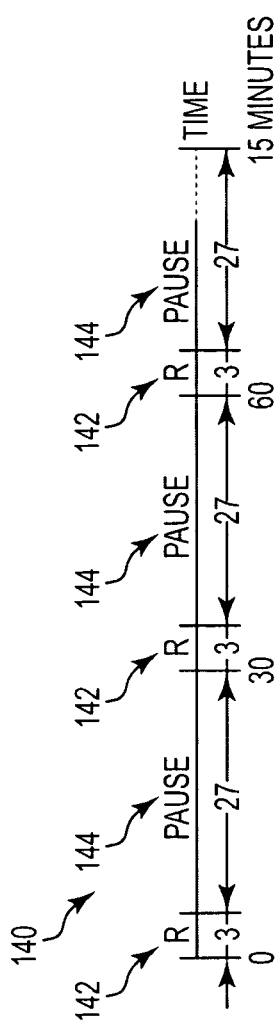
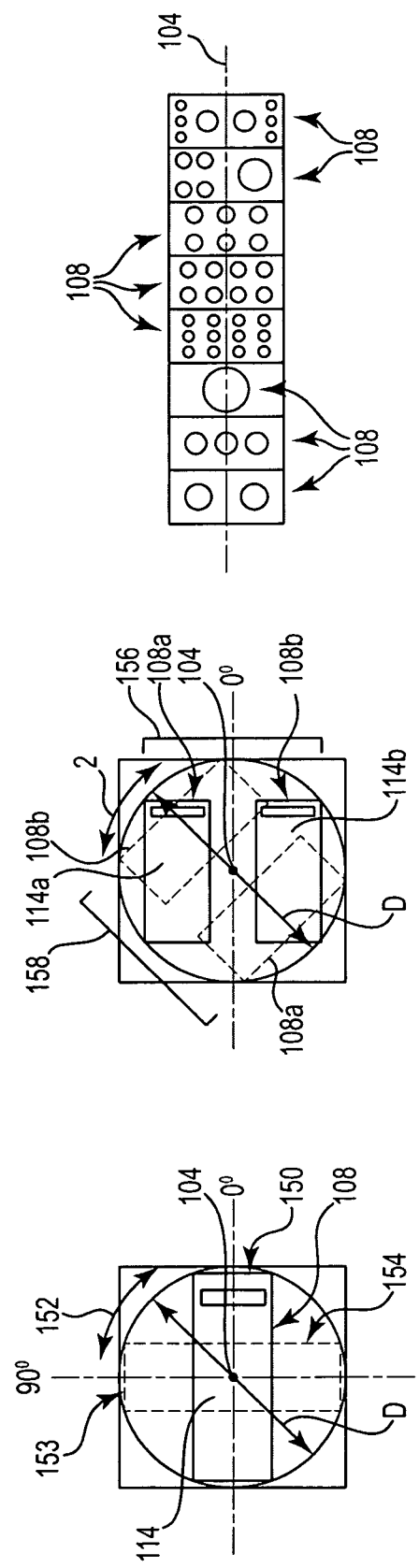
Fig. 2
Fig. 4a
Fig. 4
Fig. 3

PAINT STORAGE AND MIXING SYSTEM

CROSS-REFERENCE TO RELATED APPLICATIONS

This Utility Patent Application is a non-provisional application of U.S. Ser. No. 61/891,703, filed Oct. 16, 2013, which is incorporated herein by reference.

BACKGROUND

One or more embodiments of present application provide a novel canister storage system, mixing system, canister assembly, dispensing system, and tracking system. In one or more embodiments, the systems are used for storing, mixing and dispensing fluids or powders. In one application, the fluid includes one or more paint toners. In one embodiment, systems and devices disclosed lend themselves for use with fluids or powders that need to be measured, and in one example, precisely measured in small amounts as part of a formula.

Accurate color match in the paint mixing room requires the elimination of sources of color match errors within the mixing room's control. It is important that the painter select the correct formula, adjust the formula for color variation (for example with a spectrophotometer), properly agitate paint toners prior to placement in service, agitate toners prior to pouring, and pour the toners accurately. Further, it is important to minimize the loss of solvent in a paint container to maintain toner strength. Failure to perform one or more of these steps can result in poor color match, lower productivity, and additional paint, material, and recycling costs.

One known paint storage system stores paint containers in a daisy-wheel configuration. The whole wheel is rotated to agitate toners stored in paint containers positioned around the daisy-wheel. Due to the daisy-wheel configuration, this type of paint storage system requires a large amount of space within the paint mixing room.

Another known paint storage system stores paint containers in a rack configuration. Each paint container requires a special lid that includes a paddle for periodic mixing of paint toners, and a pour spout for dispensing of the paint toner.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 illustrates one embodiment of a paint storage system operation in a soft mixing mode.

FIG. 3 illustrates one embodiment of rotation of one or more canisters in a paint storage system.

FIG. 4 illustrates another embodiment of rotation of one or more canisters in a paint storage system.

FIG. 4a illustrates one embodiment of alternate canister configurations.

DETAILED DESCRIPTION

Figure 1:
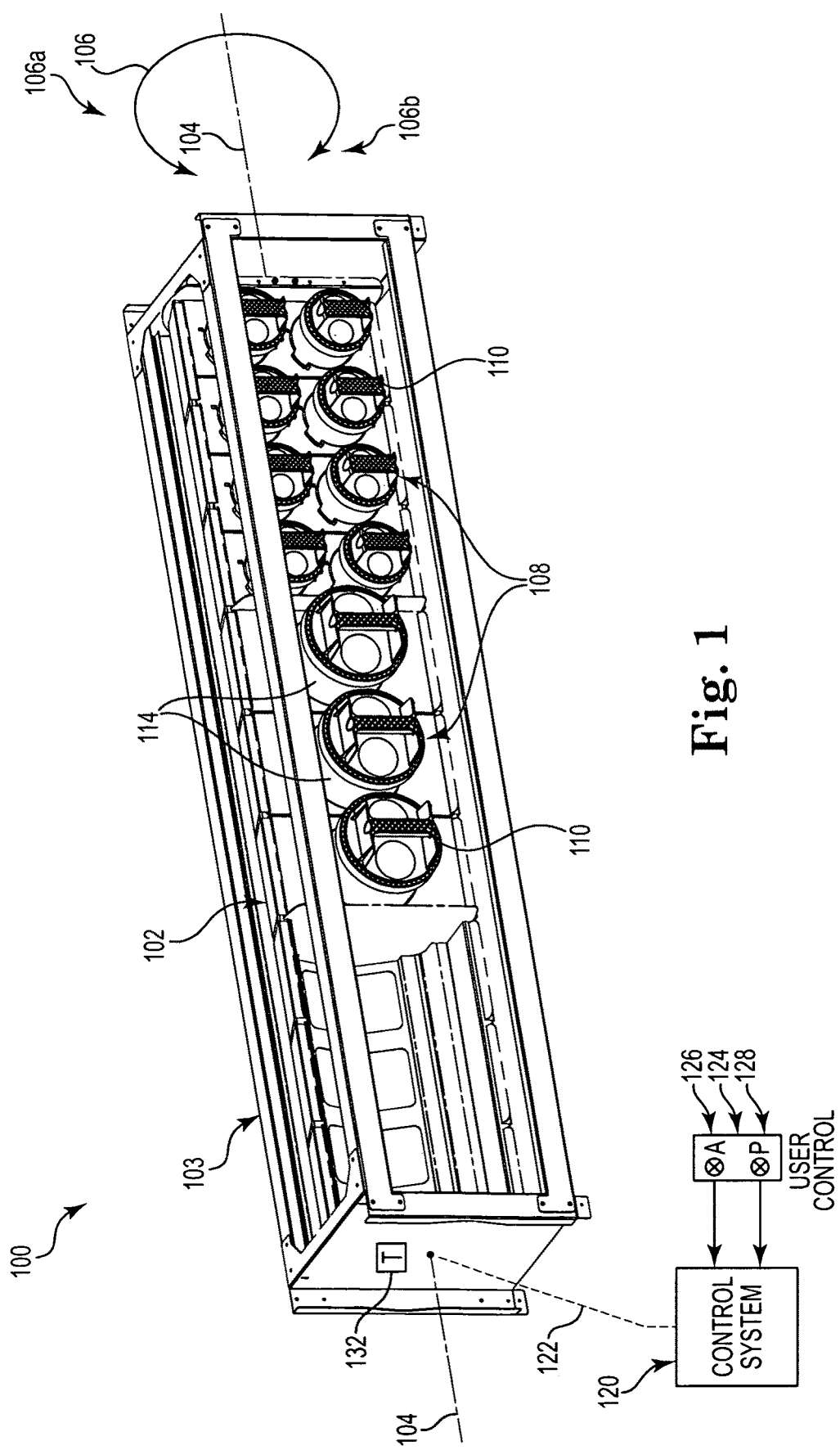
FIG. 1 illustrates one embodiment of a paint storage system.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although embodiments or examples described in this specification may refer to one or more paint systems, it is recognized that the storage, mixing, and dispensing systems and devices disclosed may be used with any type of fluid, powders, or mixtures.

Examples include pharmaceutical, food, chemicals, or automotive and decorative paint. The systems and devices may be used for measurement of fluid or powders, especially precise measurements of small amounts, for the mixing of color or non-color purposes. The systems and devices can be used to disperse a desired amount of fluid or powder materials accurately, including when it is not part of a formula. For example, it may be used to disperse amounts of medicine of additive (premixed or not) into a bottle. The systems may be used to dispense large amounts or small amounts (less than one gram).

One or more embodiments provide the next generation of paint dispensing technology that represents an evolutionary step in achieving accurate color matches compared with existing technology. The storage, agitation and dispensing system addresses all the primary sources of color match errors leading to lost productivity and additional paint and material costs.

The paint storage and mixing system in accordance with the present application can utilize a soft agitation concept when operated in an agitation mode. As disclosed herein, soft agitation operates continuously to keep toner pigments uniformly suspended in a toner canister, ready for use at any time. As such, there is no waiting for completion of an initial or midday fifteen to thirty minute agitation cycle prior to use. Alternatively, the agitation mode may provide for continuous rotation, slow rotation, fast rotation, or intermittent rotation of the canisters or containers.

The present application provides for the precise dispensing of fluid to formulate precise fluid ratios. Additionally, the systems disclosed can be used in non-color applications.

It is to be understood that the features of the various exemplary embodiments described herein may be combined with each other, unless specifically noted otherwise.

FIGS. 1-9 illustrate various views of one or more embodiments of a storage and mixing system, including one or more canisters positioned within a mixing bank for storing and maintaining a preferred state for material stored within the canister. In one embodiment, paint toner is stored in the mixing system canisters and maintained in a state ready for use. In one application, the paint toner is used in an auto body shop. In other applications, the paint is used for other purposes.

FIG. 1 illustrates one embodiment of a paint storing and mixing system at 100. System 100 includes a receiving assembly 102 positioned within a housing 103, the receiving assembly 102 being rotatable about a longitudinally extending axis of rotation 104, indicated by rotation arrow 106. One or more paint canisters 108 are removably coupled to the receiving assembly 102. Each paint canister 108 includes a first end 110, a second end (not shown in this figure), and a sidewall 114 extending between the first end 110 and the second end. The receiving assembly 102 stores and agitates (i.e., mixes) paint toner contained in the paint canister 108 in a position where the sidewall 114 is generally orthogonal to the longitudinal axis 104.

The system 100 includes a control system 120 operably coupled to the receiving assembly 102, indicated at 122. The control system 120 operates to rotate the receiving assembly 102 about the longitudinal axis 104. Control system 100 includes an actuation mechanism for rotating the receiving assembly about the longitudinal axis 104. In one example, the actuation mechanism includes at least one of a hydraulic actuator, a pneumatic actuator, or an electrical actuator.

The control system 120 operates to move the receiving assembly 102 in one or more modes of operation. In one example, the control system 120 operates the system 100 in an agitation mode 126 or a presentation mode 128. A user control 124 is provided to change between the agitation mode 126 or the presentation mode 128. The user control 124 may be located on the system 100 (for example, the housing 104), or may be located remote from the housing 104.

In other embodiments, system software can be used to control the mode of operation. Software can be used to automatically move the receiving assembly 102 to the presentation mode, based on select criteria such as a mixing formula, or to restart the agitation mode. Further, other modes may be programmed, such as a service mode, or continuous, fast, slow or intermittent rotation mode.

In the agitation mode 126, the receiving assembly 102 is rotated about longitudinal axis 104, thereby mixing the paint toner located in canisters 108. Control system 100 can be programmed to rotate the receiving assembly (including the paint canisters) according to a number of predefined parameters, such as speed of rotation, frequency of rotation, amount of rotation, direction of rotation, etc. Typically, the paint canisters will be in a presentation position prior to starting the agitation mode. In the presentation position, the canisters are in a front position and accessible to a user. In one example, the canisters include labels that are readable in the presentation position. The labels may be a visual label, such as a physical label secured to the canister, and/or an electronic label that can be read by an electronic system (e.g., an RFID tag). From the presentation position, the canisters may be removed from the system 100 for use such as for filling a paint container or refilling the canister with paint. In the illustration of FIG. 1, the canisters are in a presentation position.

In one embodiment, in the agitation mode, the receiving assembly (and paint canisters) is rotated in a first direction 106*a*, about the longitudinal axis 360 degrees in 15 minutes, then in a second (opposite) direction 106*b* about the longitudinal axis 360 degrees. In one example illustrated in FIG. 2 at 140, the receiving assembly is rotated a total of 12 degrees every 30 seconds, indicated at 142. The receiving assemble is rotated for approximately 3 seconds to move 12 degrees, then pauses for approximately 27 seconds, indicated at 144. This sequence is repeated until the receiving assembly, and canisters positioned within the receiving assembly, have rotated a full 360 degrees. This results in a revolution of 360 degrees every 15 minutes, and 4 revolutions per hour. It is recognized that the control system 120 may be programmed to rotate the receiving assembly and canisters at different speeds, directions, and durations to achieve a desired agitation result. For example, in another embodiment in the agitation mode the canisters are rotated a total of 180 degrees in one direction over a desired time period, then rotated 180 degrees in an opposite direction over a desired time period to continuously agitate paint toner contained in the canisters. The presentation mode itself is also programmable. In one example, the presentation mode is activated and the receiving assembly is moved to a presentation position for 15 minutes, then returned to the agitation mode. In other examples, the presentation mode is programmed to move to the presentation position for other periods of time, or until the agitation mode is again activated.

At any time during the agitation mode 126, the presentation mode 128 may be activated. Upon activation of the presentation mode 128, the agitation mode 126 is stopped and the receiving assembly 102 is immediately moved to the presentation position. Once in the presentation position, the canisters are available to be removed for use, or the agitation may be restarted. In one example illustrated in FIG. 1, system 100 includes user control 124 to change the system between the agitation mode 126 and the presentation mode 128 by simply pressing a button.

System 100 further includes a torque release 132. If a high torque condition is detected by torque release 132, the receiving assembly is disengaged from the control system actuator. The torque release 132 protects against possible over torque situations that may result in harm to the system 100. In one example, torque release 132 is located on housing 103 and includes a torque limiting clutch coupled to a gear assembly or drive assembly.

FIG. 3 illustrates one embodiment of control system 100 mixing a paint canister 108. System 100 is able to be contained within a much smaller "footprint" than typical paint mixing systems. The size of the housing that contains the receiving assembly and paint canisters is only limited by a rotational diameter D of the largest paint canister. The rotational diameter D is defined by the length of the paint canister. In one example, the largest paint canister in system 100 is sized to hold 4 liters of paint. When rotated about a longitudinal axis 104, this results in only a rotational diameter D equal to about 16 inches.

Paint canister 108 is illustrated in a first position 150, at 0 degrees. This location is at a presentation position in the presentation mode. The longitudinal axis of rotation 104 is orthogonal to the canister 108 sidewall 114, and extends through the middle (i.e., center) of the canister. In the agitation mode, canister 108 is rotated in a counterclockwise direction about longitudinal axis 104, illustrated by rotational arrow 152. Canister 108 is illustrated (using dashed lines) in a second location 153 as it rotates past 90 degrees (from the presentation position). Since canister 108 is rotated at its center about longitudinal axis 104, it takes up limited space within housing 103. The space for agitation and mixing of canister 108 is only rotational diameter D, defined by the rotational length of the canister.

FIG. 4 illustrates another embodiment of the rotation of canisters within system 100. Canisters 108*a* and 108*b* are about one half the size of canister 108 illustrated in FIG. 3. Even though canisters 108*a* and 108*b* are smaller than canister 108, they can all be located within the same storage system 100 shelf and rotated within the same storage space. As illustrated, canister 108*a* and canister 108*b* are positioned orthogonal to longitudinal rotational axis 104, with sidewalls 114*a* and 114*b* spaced adjacent to the axis 104. As canister 108*a* and canister 108*b* are rotated from a first, presentation position 156 to a second position 158 during agitation, it can be seen that they continue to rotated within a rotational diameter D. As configured, this is the same rotational diameter D for larger canister 108 that is positioned with the longitudinal axis 104 extending through a center of the sidewall 114 illustrated in FIG. 3. Canisters 108, 108*a* and 108*b* can all be located within the same storage system 100 shelf with a space constraint that is limited by the rotational diameter of the largest container contained in the shelf.

Further, it is recognized that many canisters can be located in different configurations within the system 100. FIG. 4*a* illustrates example canister configurations that can be used with the present system 100, indicated as canisters 108 shown relative to axis 104.

Figure 5:
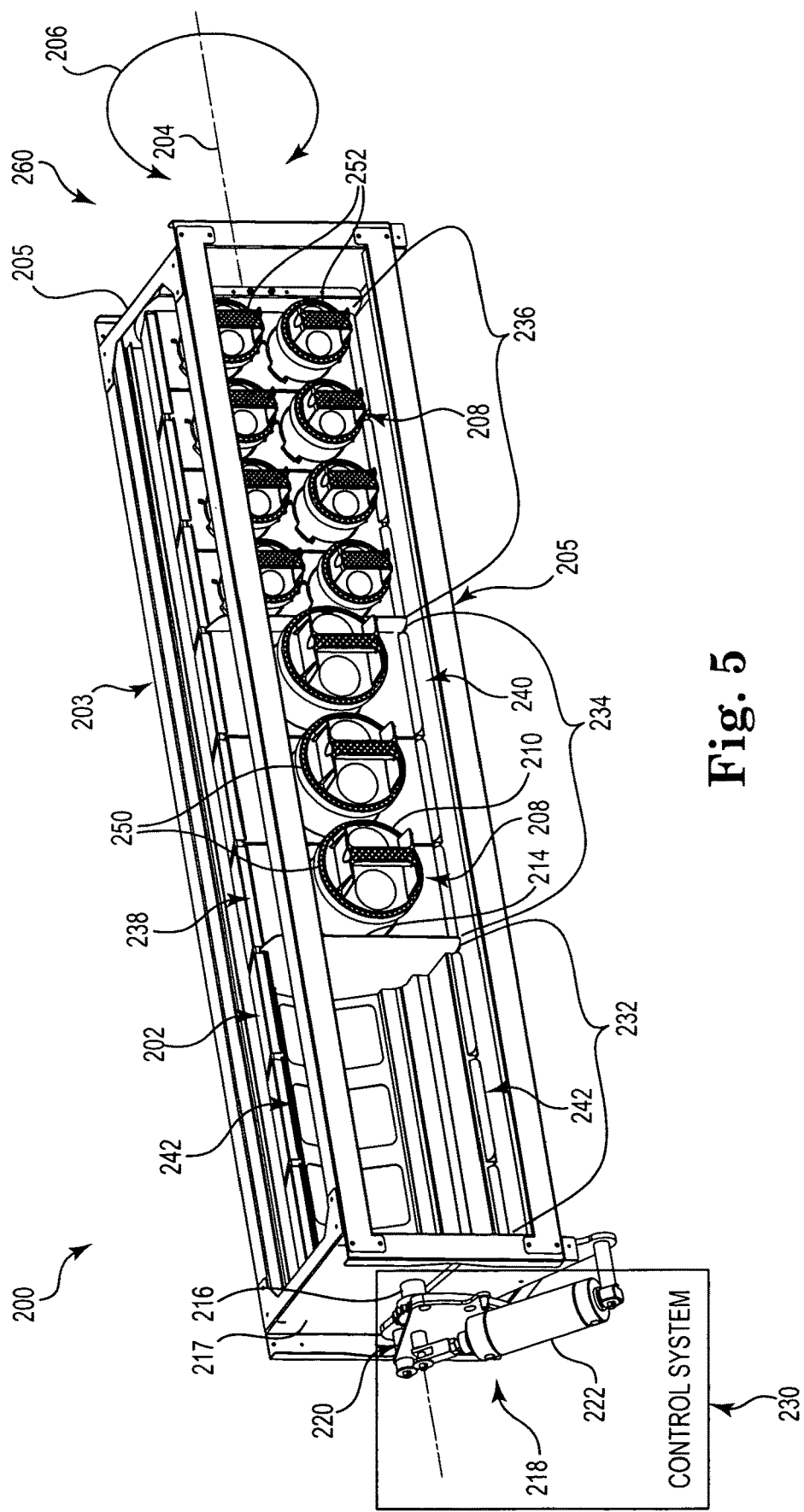
FIG. 5 illustrates another embodiment of a paint storage system.

FIG. 5 illustrates one embodiment of a paint storage system 200 contained within a shelf unit 260. Paint storage system 200 can be similar to the paint storage system 100 previously described herein. The paint storage system 200 includes receiving assembly 202 positioned within housing 203, the receiving assembly 202 being rotatable about a longitudinally extending axis of rotation 204, indicated by rotation arrow 206. One or more paint canisters 208 are removably coupled to the receiving assembly 202. Each paint canister 208 includes a first end 210, a second end (not shown in this figure), and a sidewall 214 extending between the first end 210 and the second end. In one example, the receiving assembly 202 stores and agitates (i.e., mixes) paint toner contained in the paint canister 208 in a position where the sidewall 214 is generally orthogonal to the longitudinal axis 204.

Housing 203 includes a generally rectangular frame 205. The frame 205 can be made of a metallic or nonmetallic material. Receiving assembly 202 is rotatable relative to frame 205. In one example, receiving assembly 202 includes a small rod 216 located along the center axis of rotation 204. The rod 216 extends through a sidewall 217 of housing 203, for coupling the receiving assembly to actuation mechanism 218. In one example, the actuation mechanism 218 is a hydraulic actuation mechanism and includes a gear assembly 220 couple to a hydraulic drive 222. The actuation mechanism 218 is part of a larger control system 230 that operates storage system 200 in one or more user modes, that may include an agitation or presentation mode previously described.

Receiving assembly 202 includes a first bay 232, a second bay 234, and a third bay 236. First bay 232 is illustrated without any canisters. As seen in first bay 232, receiving assembly 202 includes a first edge 238 and a second edge 240. A coupling member 242 is located at the first edge 238 and the second edge 240 for removably engaging a receiver panel. The receiver panels operate to hold a canister in a desired position during operational modes of the storage system, such as the agitation mode and presentation mode previously described herein. One or more examples of receiver panels in combination with paint canisters are described in further detail later in this application. As used herein, a receiver cell is a location within the receiving assembly that includes a receiver panel and canister.

Figure 6:
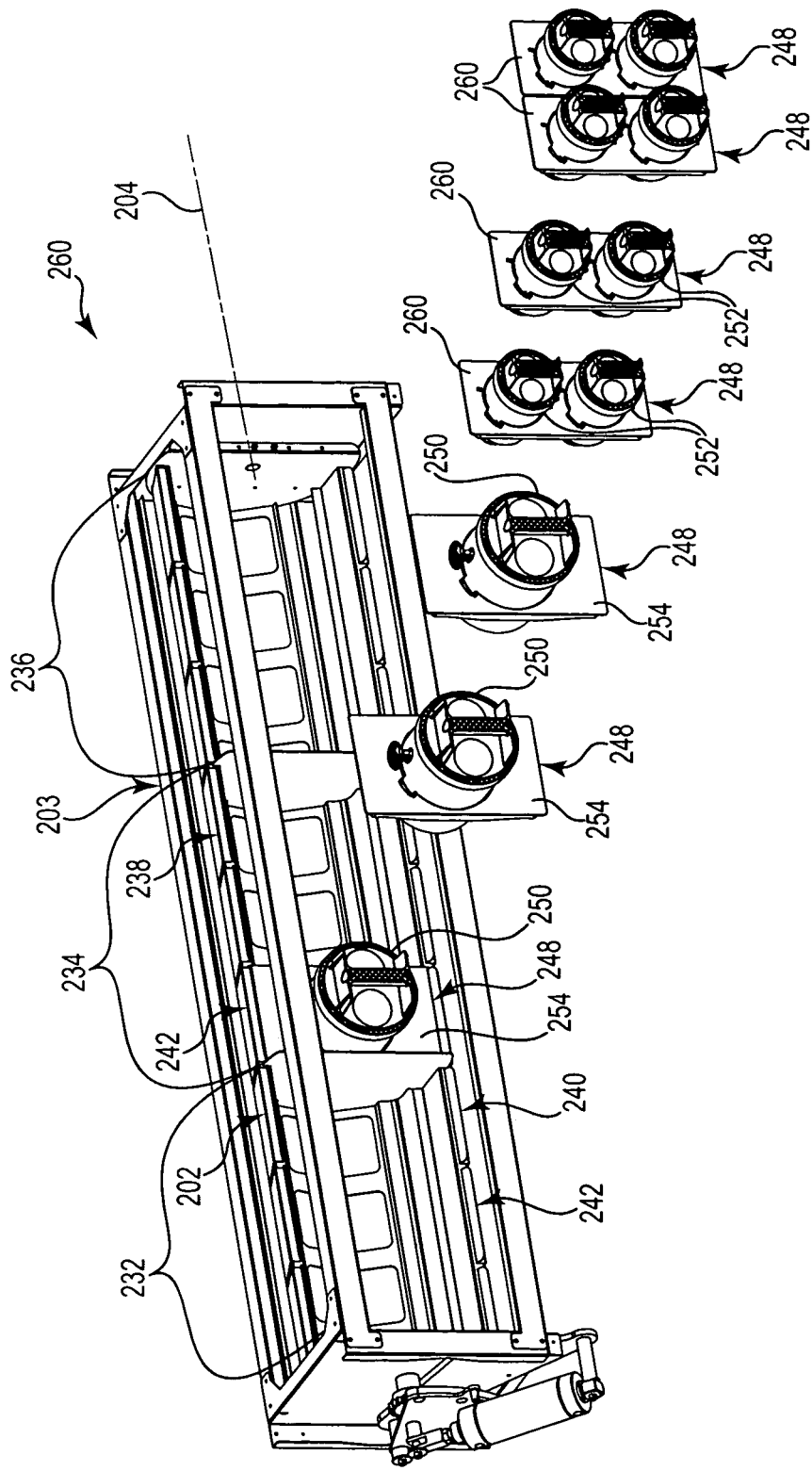
FIG. 6 illustrates an exploded view of one embodiment of the paint storage system of FIG. 5.

Reference is also made to FIG. 6, which illustrates a number of receiver cells 248 ready to be positioned within the receiving assembly 202. In one embodiment, canisters 208 include large canisters 250 and small canisters 252. In one example, bay 234 has large canisters 250 contained therein. Each large canister 250 is removably attached to a receiver panel 254. In turn, each receiver panel 254 is secured to receiving assembly 202 via coupling member 242. In one embodiment, coupling member 242 includes a metal edge under tension that secures a receiver panel 254 against the receiving assembly 202 first edge 238 and second edge 240. As illustrated, bay 234 is sized to hold three large canisters 250. The canisters 250 are shown in a presentation position where they are available for use and removable from the storage system 200.

Small canisters 252 are illustrated positioned within bay 236. As illustrated, two small canisters 252 are positioned within each receiver panel 260. Further, since receiver panels 260 are smaller than receiver panels 254. Three receiver panels 254 with large canisters 250 fit in bay 234. Four receiver panels 260 with a total of eight small canisters 252 fit into bay 236. In one example, the large canisters hold about four times as much paint as the small canisters. Other canister configurations can be used within the receiving assembly. See, for example, FIG. 4b. The canisters may range in being very small in size (e.g., 0.1 liter) to very large in size (multiple liters).

Figure 7:
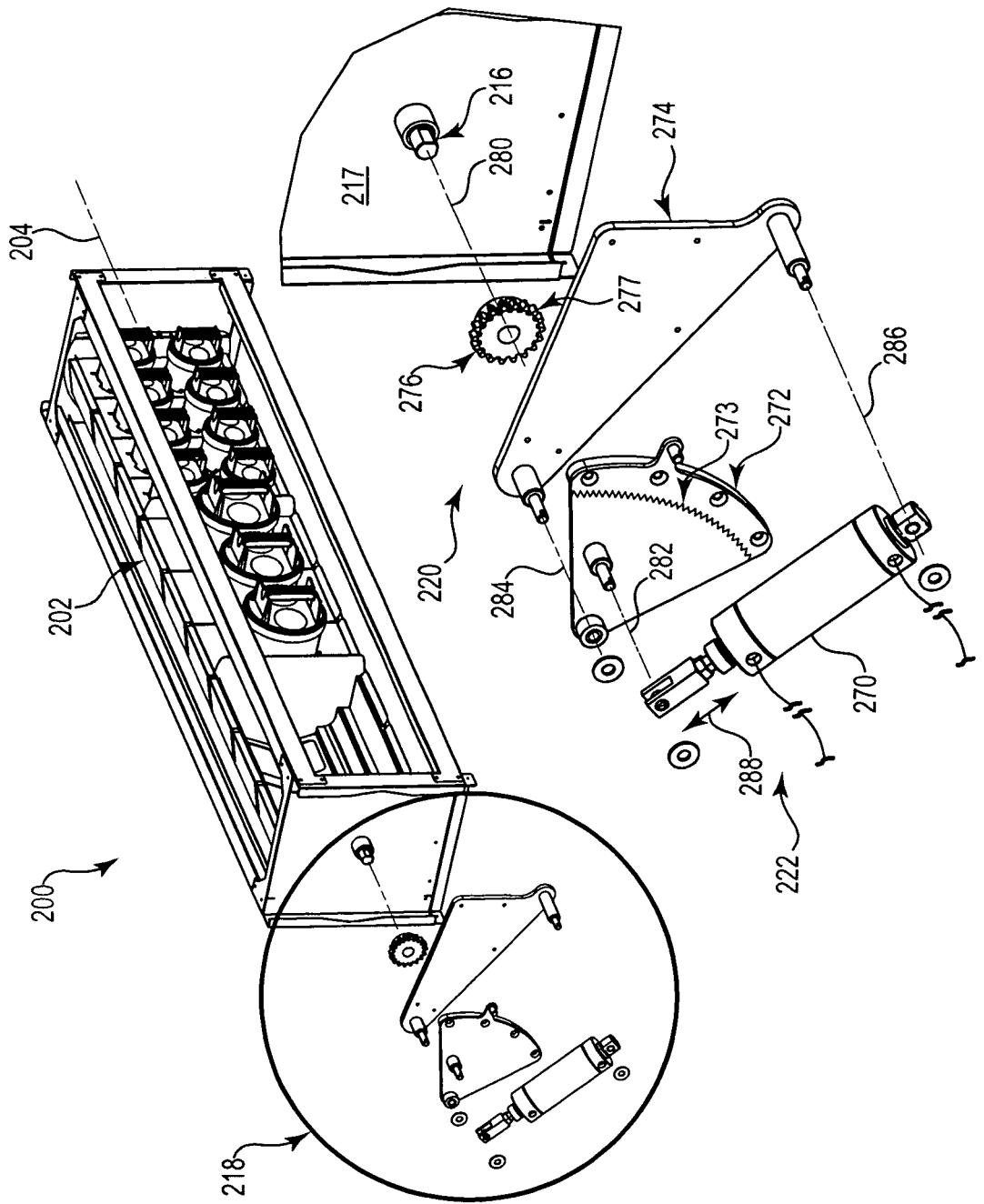
FIG. 7 illustrates one embodiment of a paint storage system, including an exploded partial view of a drive mechanism.

FIG. 7 illustrates one embodiment of a paint storage system, including an expanded view of actuation mechanism 218. The actuation mechanism 218 is a hydraulic actuation mechanism. In one example, the hydraulic actuation mechanism includes gear assembly 220 and hydraulic drive 222. Actuation mechanism 218 rotatably couples to receiving assembly 202 for rotation of paint canisters in an agitation mode.

In one example, actuation mechanism 218 includes hydraulic drive 222 having a hydraulic cylinder 270, and gear assembly 220 including first gear 272 having first gear teeth 273, reinforcing plate 274, and second gear 276 having second gear teeth 277. In assembly, second gear 276 is attached to rotatable shaft or rod 216, indicated at 280. First gear 272 is a sector gear, and is direct coupled to hydraulic cylinder 270, indicated at 282. Reinforcing plate 274 is coupled to both the hydraulic piston 270 and the first gear 272, indicated at 284 and 286. First gear teeth 273, located on a back side of first gear 272, are engaged with second gear 276 via second gear teeth 277.

In operation, hydraulic piston 270 operates as a linear actuator, indicated by directional arrows 288. The actuation mechanism 218 is operated via the control system (not shown), causing hydraulic cylinder 270 to move in a linear manner. The hydraulic cylinder 270, in turn, provides movement to first gear 272. Since first gear teeth 273 are engaged with second gear teeth 277, movement of first gear 272 causes second gear 276 to rotate which also rotates the receiver assembly via rotatable shaft or rod 216.

Figure 8:
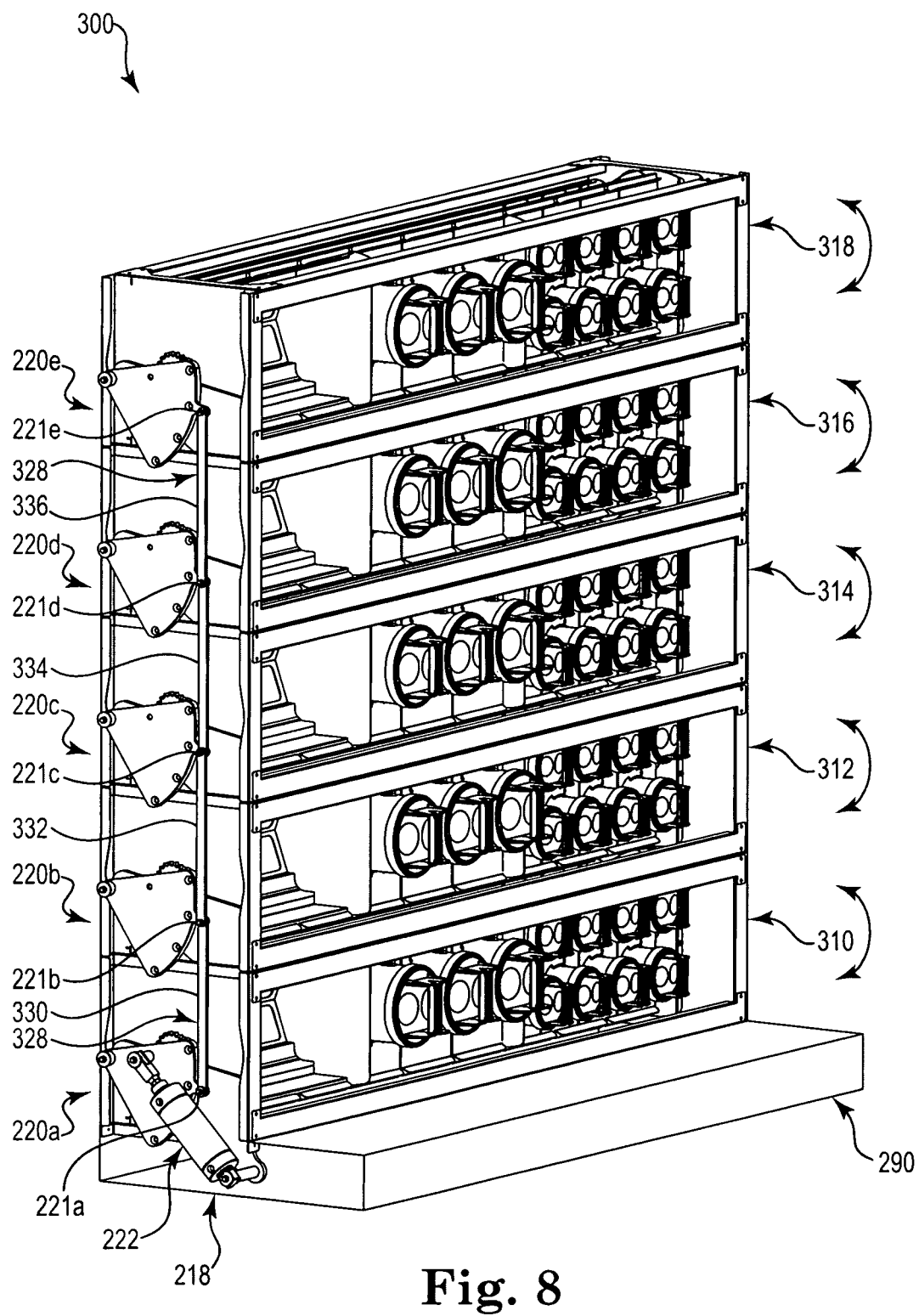
FIG. 8 illustrates another embodiment of a paint storage system in a stackable mixing rack configuration.

FIG. 8 illustrates another embodiment of a paint storage and mixing system generally at 300. Storage system 300 is similar to storage systems 200 and 100 previously described herein. In this embodiment, one or more modular shelves are stacked to form a mixing bank. In one example, the modular shelves are stacked vertically upon each other, with the bottom shelf being positioned on a base. In other examples, the shelves may be stacked in alternative manners such as longitudinally adjacent each other. The mixing bank forms a rack system for storage and maintenance of paint canisters. Any number of shelves can be included in the mixing bank.

Figure 9:
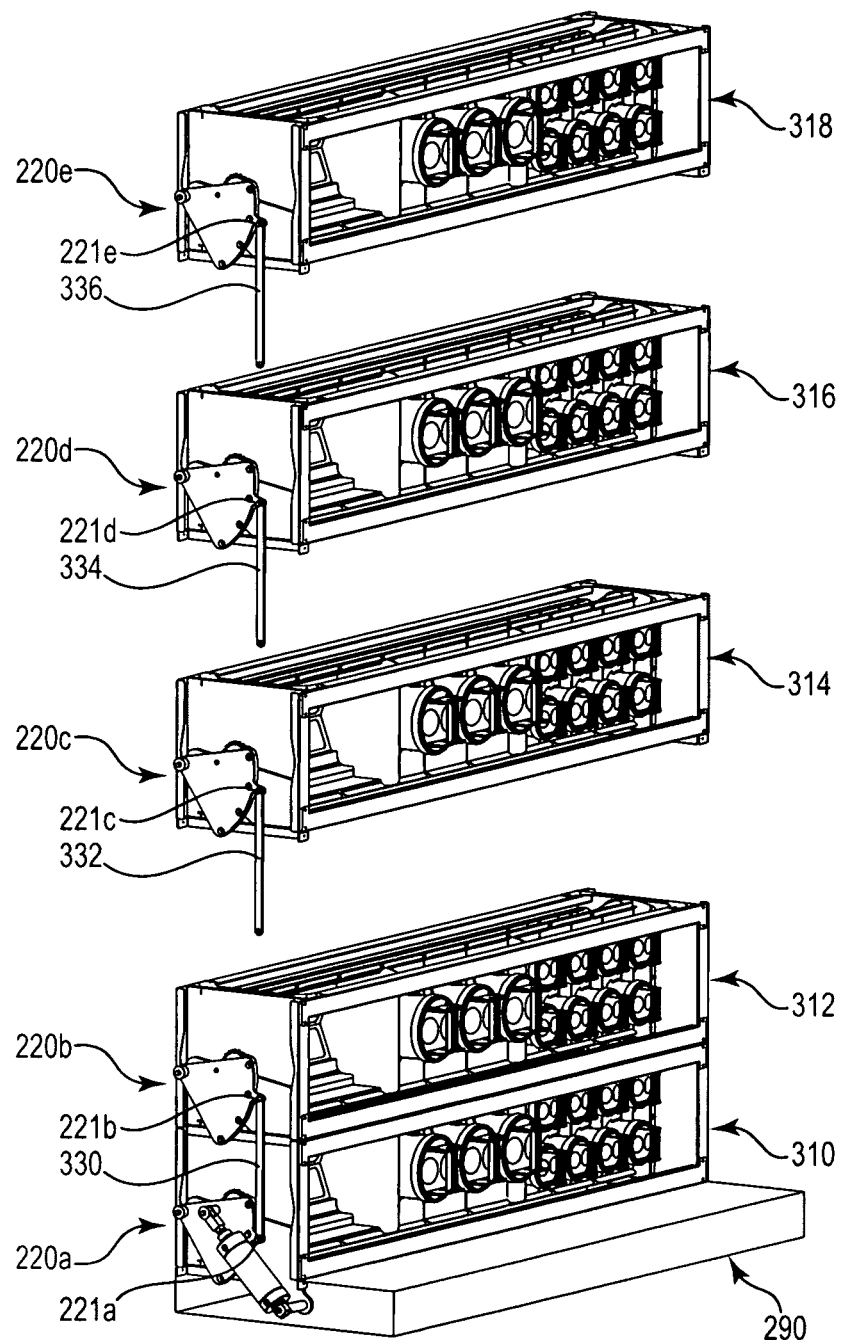
FIG. 9 illustrates an exploded view of one embodiment of the paint storage system of FIG. 8.

In the example illustrated, the paint storage system 300 includes first shelf 310, a second shelf 312, a third shelf 314, a fourth shelf 316, and a fifth shelf 318. With reference also to FIG. 9, paint storage system 300 is a modular, stackable system, with second shelf 312 stacked on first shelf 310, third shelf 314 stacked on second shelf 312, fourth shelf 316 stacked on third shelf 314, and fifth shelf 318 stacked on fourth shelf 316. First shelf 310 is positioned on a base 290. Base 290 can be used to house additional mechanical or electrical elements, and also provide additional clearance to the storage system 300.

Each shelf 310, 312, 314, 316, 318 can be similar or even identical, except that one shelf (shelf 310) includes an actuation mechanism 218 that has a drive 222. Only one drive is needed for agitation of the paint canisters positioned in the whole storage system 300. In the example illustrated, shelf 310 includes drive 222 operably coupled to gear assembly 220a, and as previously detailed herein. Each shelf 312, 314, 316, and 318 includes a corresponding gear assembly 220b, 220c, 220d and 220e, operably coupled to each other via connecting rod assembly 328. Each gear assembly includes connecting rod pin, indicated as connecting rod pins 221a, 221b, 221c, 221d, and 221e. Connecting rod assembly 328 is formed by connecting rod 330 coupled between connecting rod pin 221a and 221b; connecting rod 332 coupled between connecting rod pin 221b and 221c; connecting rod 334 coupled between connecting rod pin 221c and 221d; and connecting rod 336 coupled between connecting rod pin 221d and 221e. In operation, the control system operates drive 222 coupled to gear assembly 220a to rotate the receiving assembly and canisters contained in shelf 310. Further, since connecting rod assembly 328 couples each gear assembly 220a, 220b, 220c, 220d, and 220e together, operation of drive 222 also rotates the receiving assemblies and corresponding canisters in each stacked shelf 312, 314, 316, and 318.

In other embodiments, each shelf includes its own drive or a drive is used for 2, 3, or 4 shelves, etc.

In one embodiment, a soft mixing system is used with the mixing bank 300 for maintaining fluid contained in each canister in a state ready for use. In one example, the mixing bank operates to slowly rotate the canisters about the longitudinally extending axis. Slow rotation of the canisters may include full rotation around the longitudinally extending axis, or a back and forth rotation about the axis. In one embodiment, a canister makes several rotations per day. When paint toners are contained within each canister, the continuous, intermittent, or timed rotation of the canisters provides for tumbling and mixing of the toner pigments keeping the canister in a state ready for use.

The soft mixing system 300 may further include a presentation mode as previously described. When a user approaches the mixing bank, the canisters may be in any position as they slowly rotate about the longitudinal axis. The presentation mode provides for the canisters to immediately be moved within the shelves to a presentation position with each canister label readily viewable by the user. The presentation mode may be initiated by the user through the control system, the simple control button located adjacent the mixing bank or via programmed control. Although the soft mixing system 300 may be operating at a first, slow speed for constant or intermittent rotation and mixing of the fluid in the canisters so it is ready for use, the presentation mode may use a second, fast speed (relative to the first speed) for immediately moving the canisters into a presentation mode for viewing and use. The drive mechanism (that may also include a variable speed drive) communicates with the control system to provide the first slow mixing speed, then quickly being able to switch to a second faster speed for presentation of the canisters.

Figure 10:
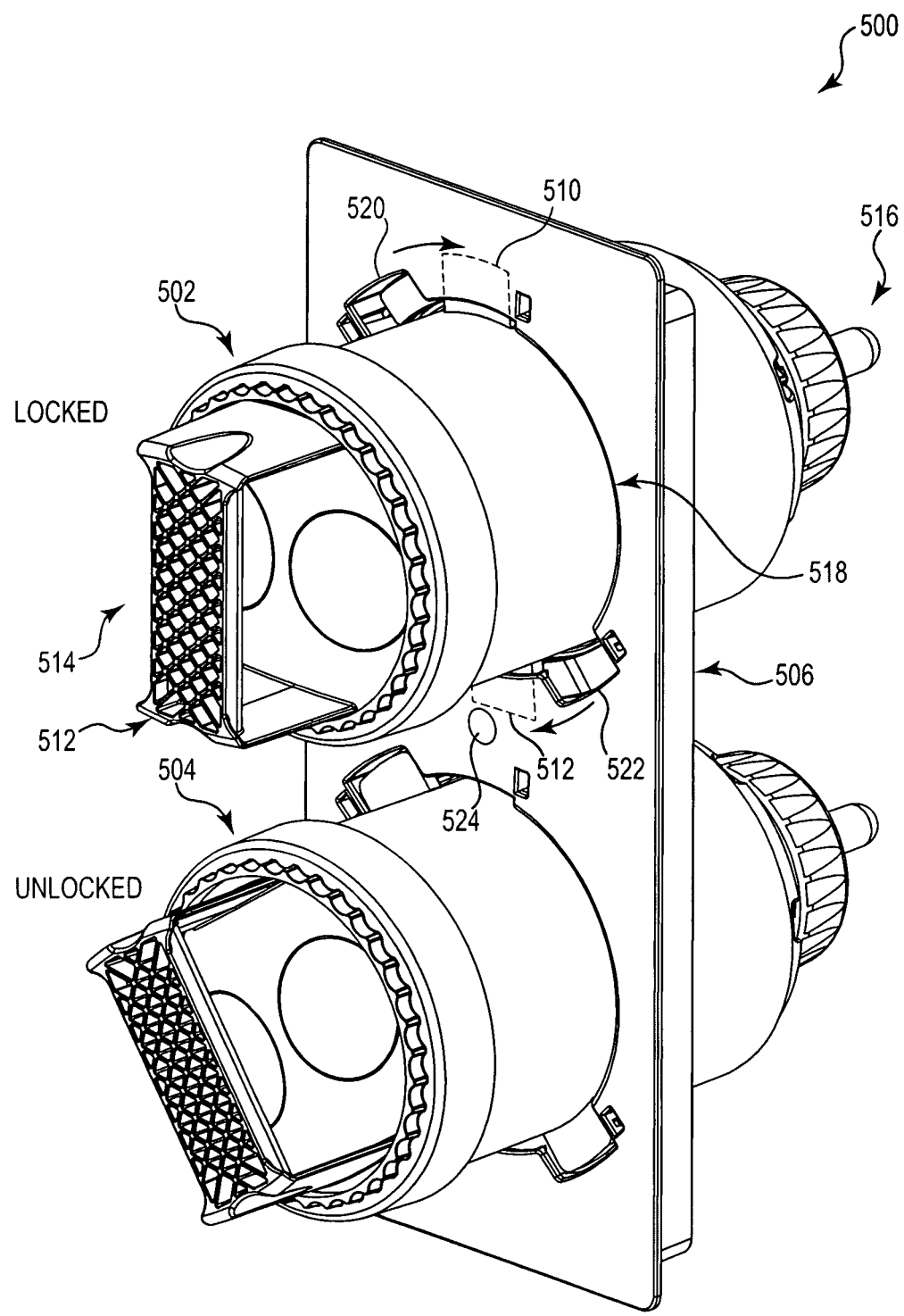
FIG. 10 illustrates a front perspective view of one embodiment of a receiver cell.

FIG. 10 illustrates a front perspective view of one embodiment of a receiver cell, indicated generally at 500. Receiver cell 500 is suitable for use with one or more paint mixing, storing and/or dispensing systems disclosed in this application. Receiver cell 500 includes a first paint canister 502 and a second paint canister 504 positioned within receiving panel 506. First paint canister 502 and second paint canister 504 are positioned within receiving panel 506 by "twist locking" them into position. In one example illustrated, first paint canister 502 is in a locked position and second paint canister 504 is in an unlocked position.

Figure 11:
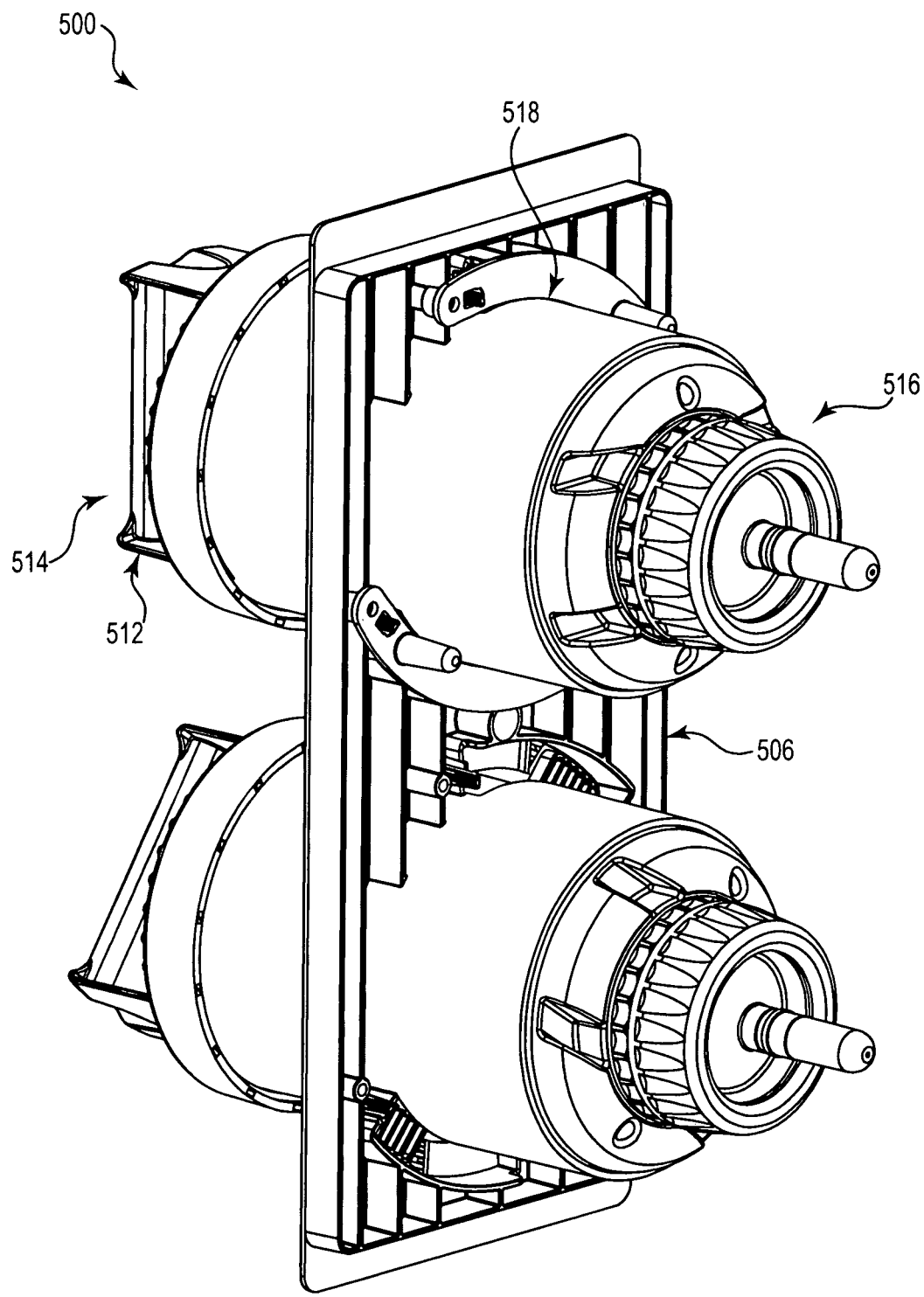
FIG. 11 illustrates a rear perspective view of one embodiment of a receiver cell.
Figure 12:
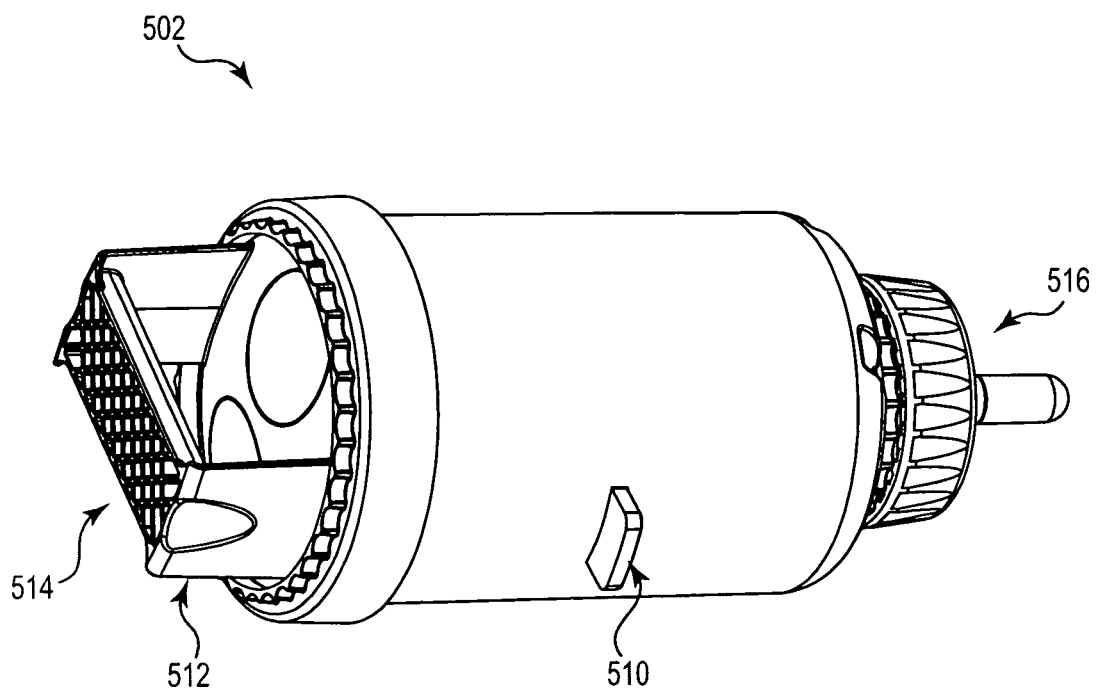
FIG. 12 illustrates a first perspective view of one embodiment of a canister.
Figure 13:
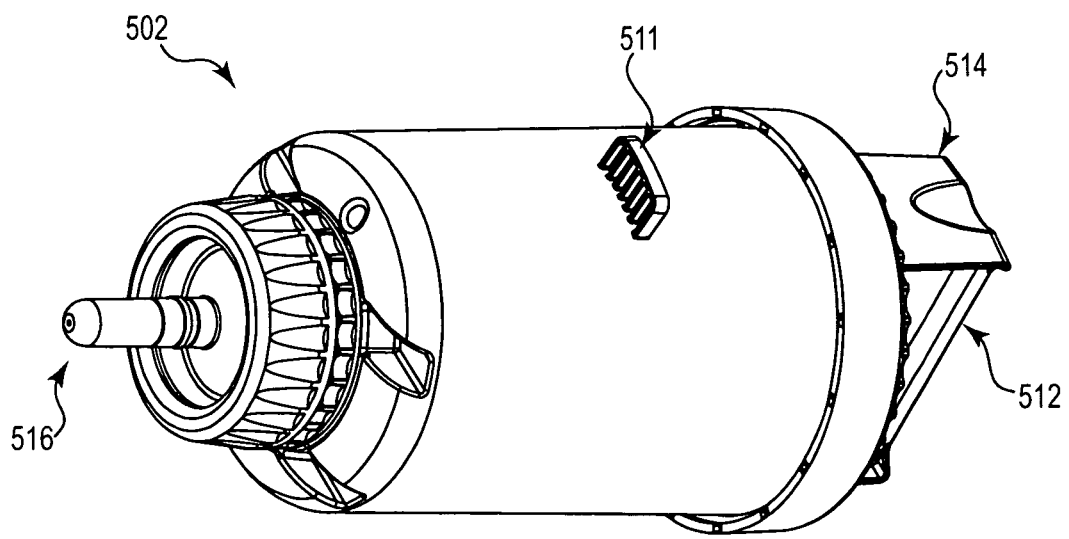
FIG. 13 illustrates a second perspective view of one embodiment of a canister.

Reference is also made to FIG. 11 illustrating a rear perspective view of one embodiment of a receiver cell 500, and FIG. 12 and FIG. 13 generally illustrating a top and bottom perspective view of a paint canister, such as paint canister 502. It is noted that the paint canisters used in the paint storage, mixing and dispensing systems are described in greater detail later in the application. Paint canister 502 includes a first locking tab 510, and a second locking tab 511. In order to lock canister 502 in receiver panel 506, a user grabs handle 512 at a first end 514 and inserts the canister 502 second end 516 through the opening 518 in the receiver panel. First locking tab 510 and second locking tab 511 are inserted into locking slots 520 and 522 respectively. By pushing forward and twisting the canister 502 in a clockwise direction, the canister 502 is twist locked into position in the receiving panel 506.

Figure 14:
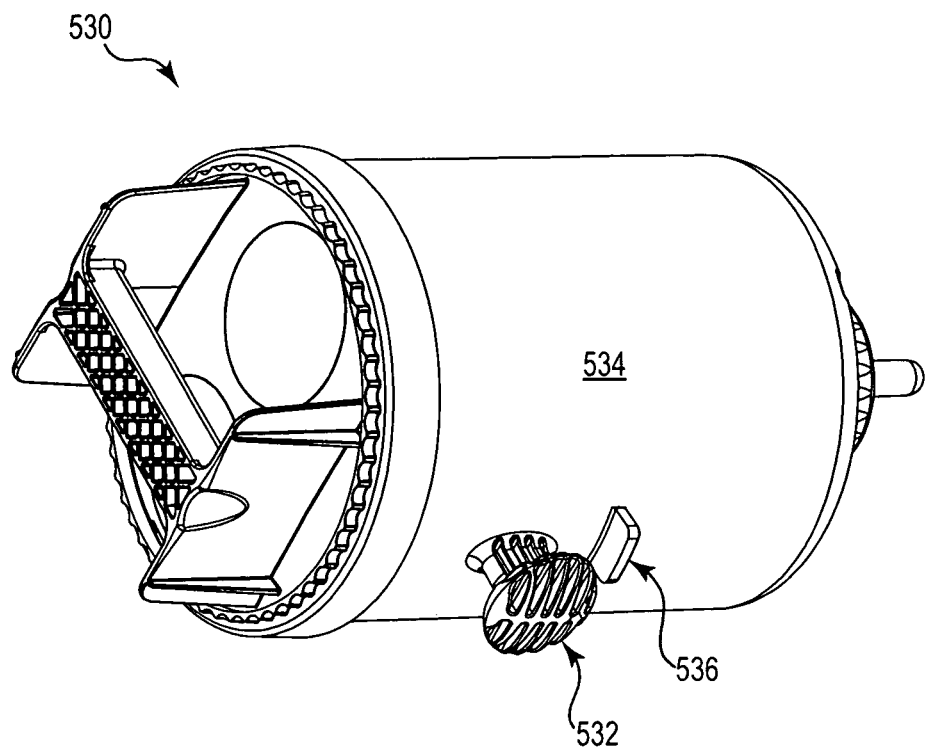
FIG. 14 illustrates a first perspective view of another embodiment of a canister.
Figure 15:
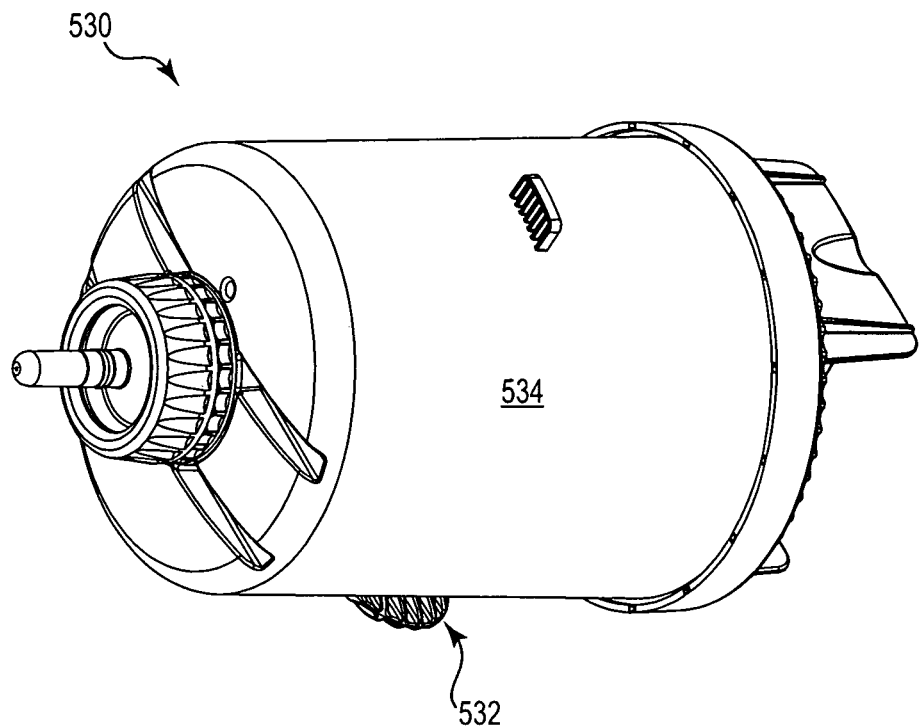
FIG. 15 illustrates a second perspective view of another embodiment of a canister.

For smaller canisters, multiple canisters can be located on a single receiving panel. In one example, first canister 502 and second canister 504 are sized to contain two liters or less of a fluid. The canisters 502, 504 are spaced symmetrically about a receiving panel center 524. For larger canisters, a single canister is positioned at the center 524 of a receiving panel (as illustrated in one or more previous Figures). One embodiment of a larger canister is illustrated in FIG. 14 and FIG. 15, indicated at 530. Canister 530 is similar to the canisters previously described herein, such as first canister 502 and second canister 504, and further includes a side handle 532. Since the canister 530 is larger in size, side handle 532 aids in positioning canister 530 in a receiving panel, locking the canister 530 in the receiving panel, and subsequently removing the canister 530 from a receiving panel for use. In one embodiment the side handle 532 is generally knob shaped, and is located along sidewall 534 near locking tab 536. Alternatively, canister 530 may not include a second handle. In one example, canister 530 is sized to contain 4 liters or more of liquid.

Figure 16:
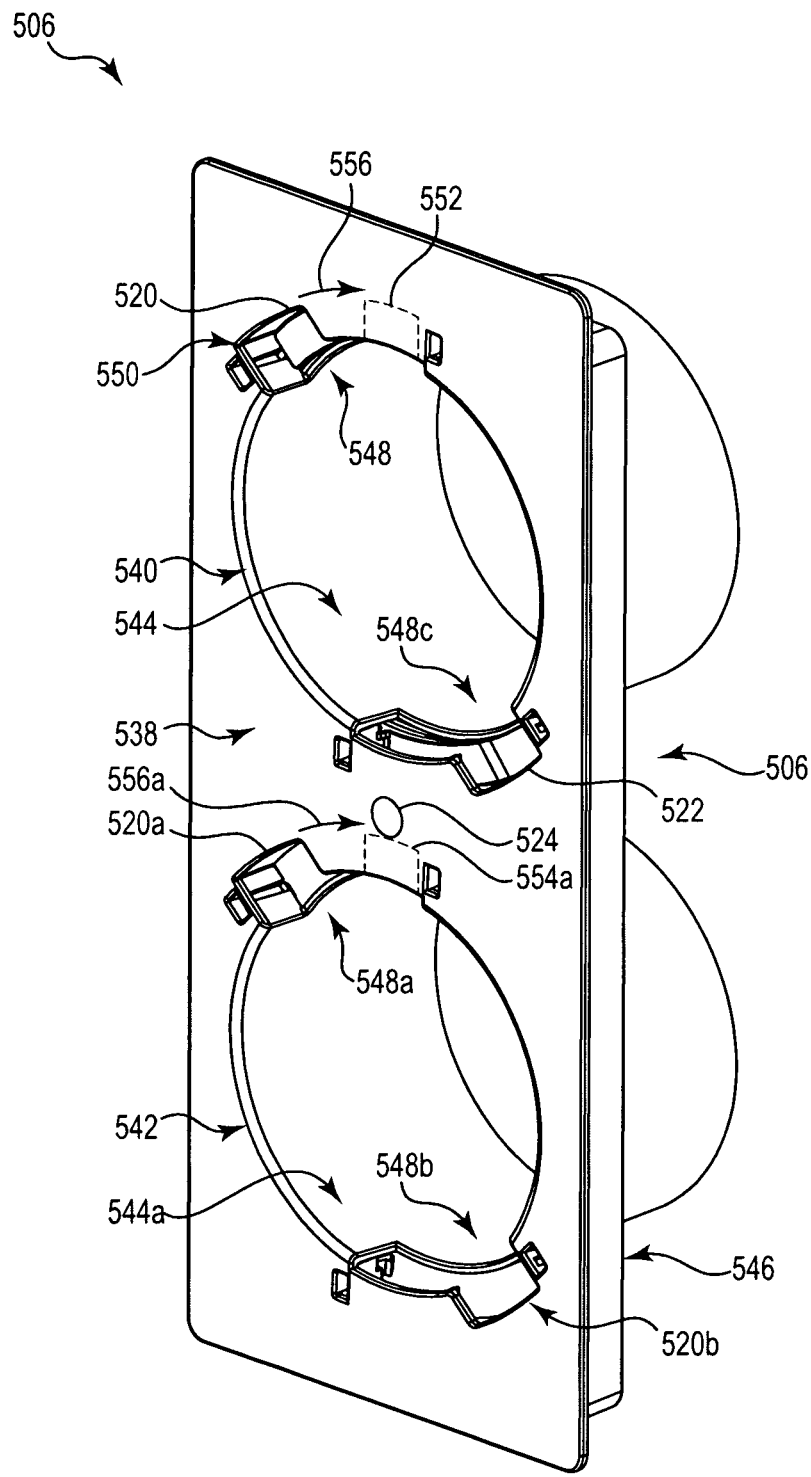
FIG. 16 illustrates a front perspective view of one embodiment of a receiving panel.

FIG. 16 illustrates a front perspective view of one embodiment of a receiver panel, indicated as receiver panel 506. Receiver panel 506 has a generally planar top layer 538 that includes a first opening 540 and a second opening 542. First opening 540 and second opening 542 are circular shaped, and sized to receive a corresponding canister. First opening 540 includes a sidewall 544 that has a cylindrical interior surface. The sidewall 544 extends deeper than a back support 546. Tab slot 520 and tab slot 522 are located at opposite sides of the first opening 540, and are sized to receive a corresponding canister locking tab.

Tab slot 520 is configured to include a locking mechanism 548 for twist locking and retaining a canister locking tab. In one example, the locking mechanism 548 includes a locking arm and spring assembly to aid in retaining a canister locking tab that is moved between a first position at 550 with a locking tab inserted in tab slot 520, and a second locking position, indicated at 554 by dashed lines and by directional arrow 556. Similarly, tab slot 522 includes a locking mechanism 548c.

Second opening 542 includes a sidewall 544a, locking slots 520a and 520b, and locking mechanisms 548a and 548b located at respective tab slots 520a and 520b. Second opening 542 is configured and operates similar to first opening 540. In one example, the locking mechanism 548a, 548b includes a locking arm and spring assembly to aid in retaining a canister locking tab that is moved between a first position with a locking tab inserted in tab slot 520a, and a second locking position, indicated at 554a by dashed lines and by directional arrow 556a.

Figure 17:
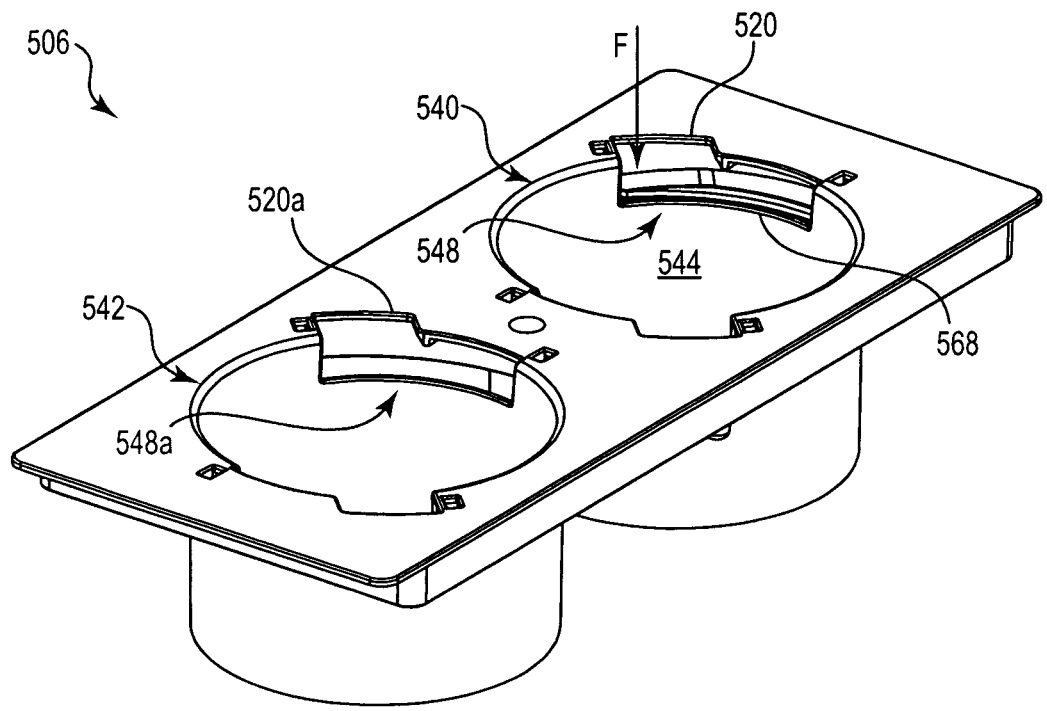
FIG. 17 illustrates a side perspective view of one embodiment of a receiving panel.
Figure 18:
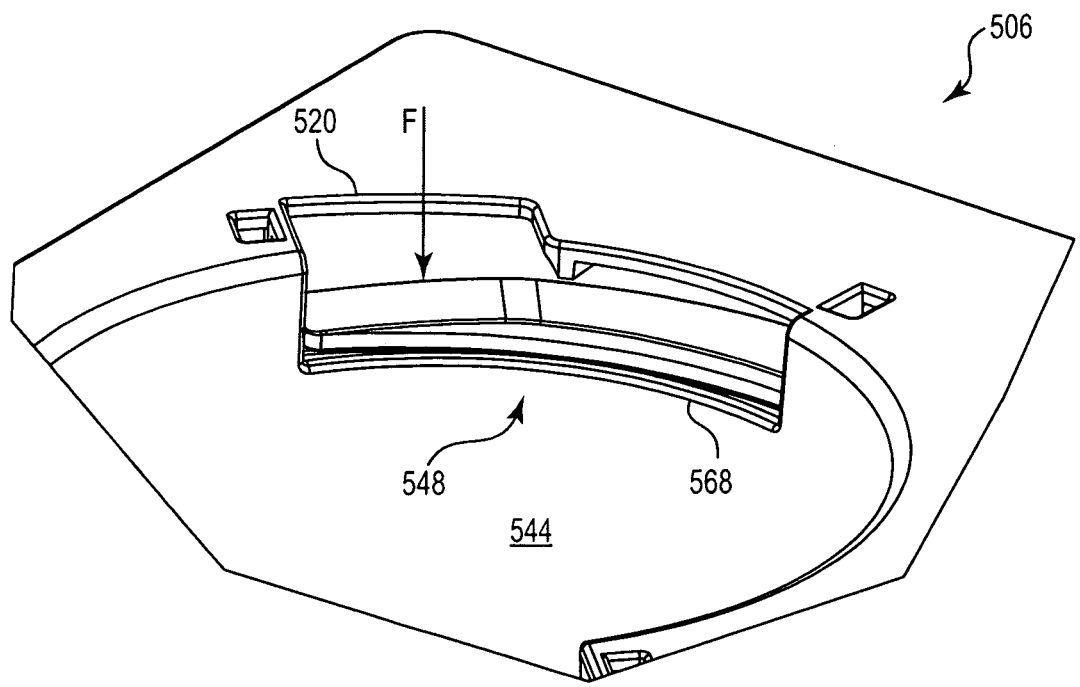
FIG. 18 illustrates an enlarged side perspective partial view of one embodiment of a receiving panel.
Figure 20:
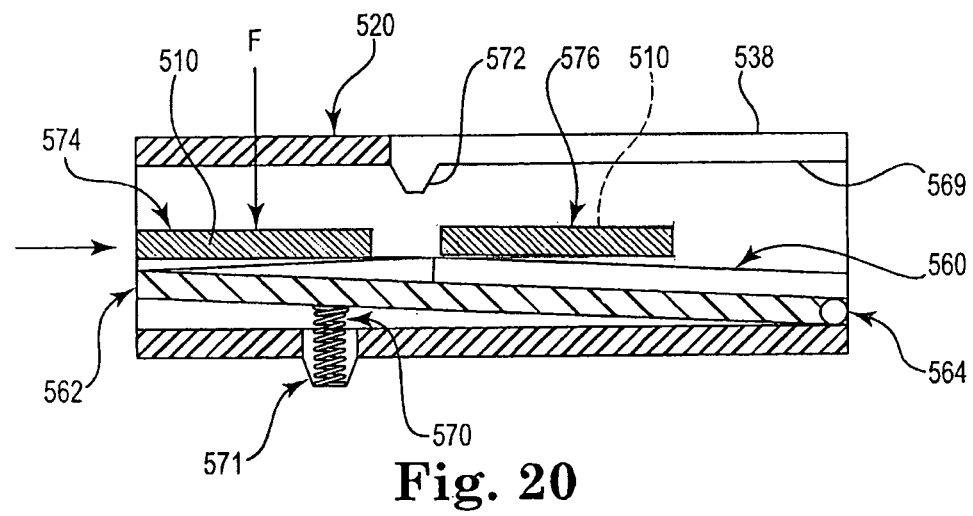
FIG. 20 illustrates a side view of another embodiment of a locking mechanism in an unlocked position.
Figure 21:
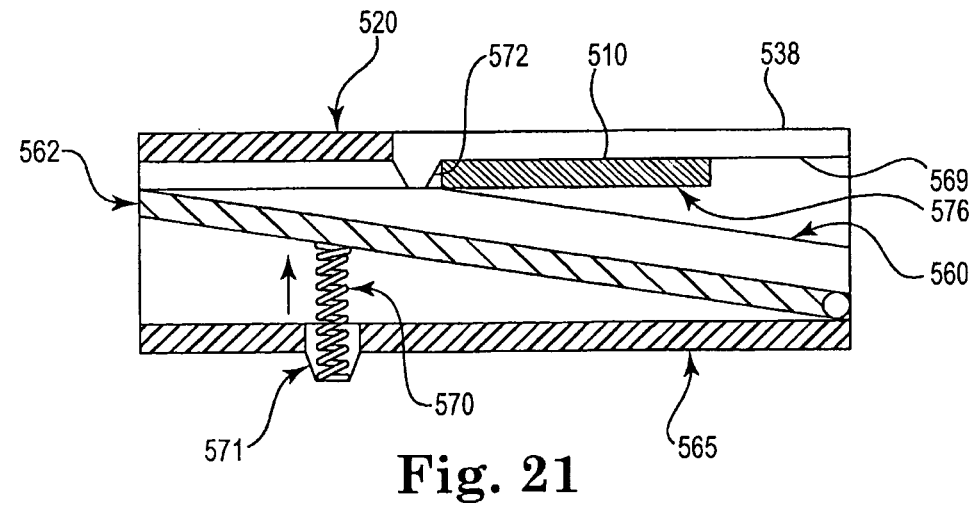
FIG. 21 illustrates a side view of one embodiment of a locking mechanism in a locked position.

FIG. 17 illustrates another front perspective view of the receiver panel 506 of FIG. 16, including a side view of tab slots 520 and 520a, each including a corresponding locking mechanism 548 and 548a. FIG. 18 illustrates a partial enlarged perspective side view of locking mechanism 548. Additionally, FIG. 19, FIG. 20 and FIG. 21 illustrate a simplified side elevation view of the operation of a locking mechanism similar to locking mechanism 548.

Locking mechanism 548 includes a locking arm 560 including a first end 562 and a second end 564, and a retainer 565. Locking arm 560 is rotatably coupled to the retainer 565 at second end 564. In one example, locking arm 560 increases in thickness from the first end to a midpoint, indicted at 566. The locking arm 560 then maintains a substantially uniform thickness between the midpoint 566 and second end 564. Retainer 565 includes a generally cup shaped spring receiver 571 for retention of a spring 570. The spring 570 is positioned between the locking arm 560 and the retainer 565, and maintained in a position between first end 562 and midpoint 566. The locking mechanism is located within tab slot 520, within an area defined by a recess 568 in sidewall 544 and a bottom side 569 of planar top layer 538. A bayonet fitting or protrusion 572 extends from bottom side 569 at a location proximate the middle point 566.

Figure 19:
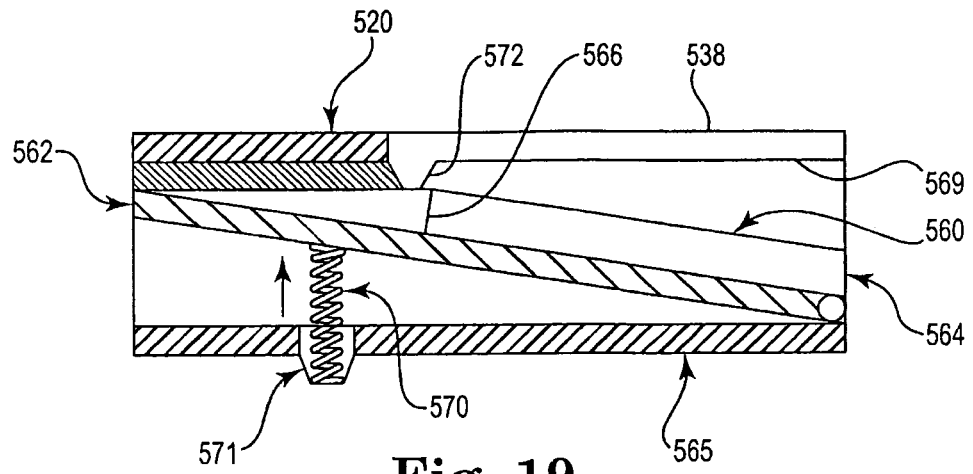
FIG. 19 illustrates a side view of one embodiment of a locking mechanism in an unlocked position.

FIG. 19 illustrates the position of a locking mechanism when a canister is not located in receiving panel 506, and as such, a locking mechanism locking tab is not located within the tab slot 520. Spring 570 operates to push up locking arm 560 against protrusion 572. In reference to FIG. 20, in use with a canister locking tab, such as first locking tab 510, is inserted in tab slot 520 and pressed downward on locking arm 560 (indicated by force arrow F). The downward force on locking arm 560 compresses spring 570 and creates a space between protrusion 572 and locking arm 560. This compressed state allows the locking tab 510 to move from a first position 574 illustrated in FIG. 20, passed protrusion 572, to a second position 576 illustrated in FIG. 21. Downward pressure on first locking tab 510 is released, and spring 570 operates to provide an upward force against locking arm 560 and moving locking arm to press upward against protrusion 572. This upward force maintains first locking tab 510 (and the associated canister) in a locked position illustrated in FIG. 21. By applying downward pressure on locking tab 510, spring 570 is again compressed and the locking arm 560 is moved downward allowing the locking tab to move from the second locked position 576, passed the protrusion 572, to the first unlocked position 574.

Figure 22:
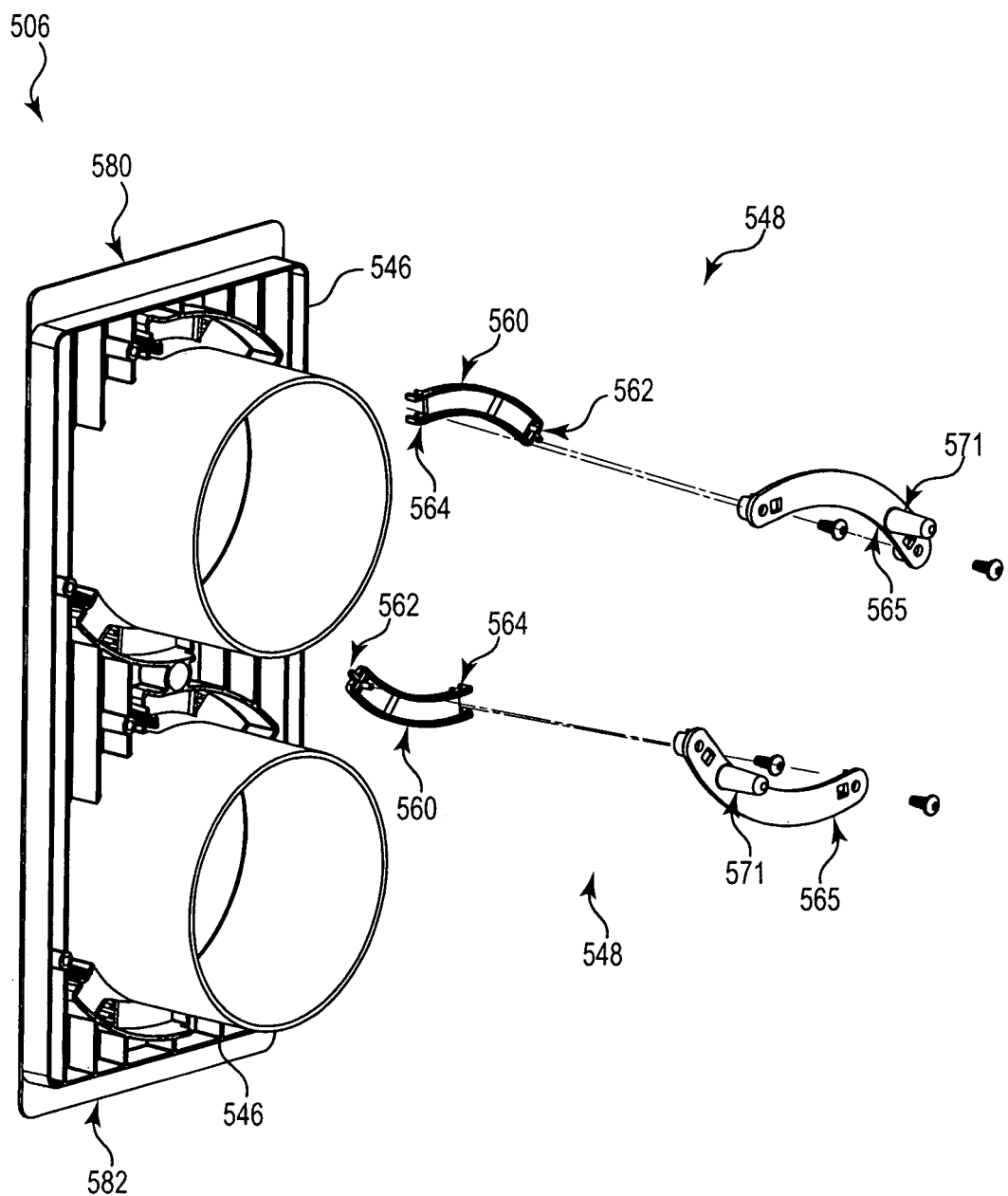
FIG. 22 illustrates a rear perspective view of one embodiment of a receiving panel.

FIG. 22 illustrates a rear perspective view of receiving panel 506. Locking mechanism 548 is illustrated in an exploded view, and operates as previously described. Receiving panel 506 includes a first end 580 and a second, opposite end 582. First end 580 and second end 582 extend beyond back support 546, and are used by storage unit receiving assembly coupling members, such as receiving assembly 102 coupling members 242, to retain receiving panel 506 in the receiving assembly.

Figure 23:
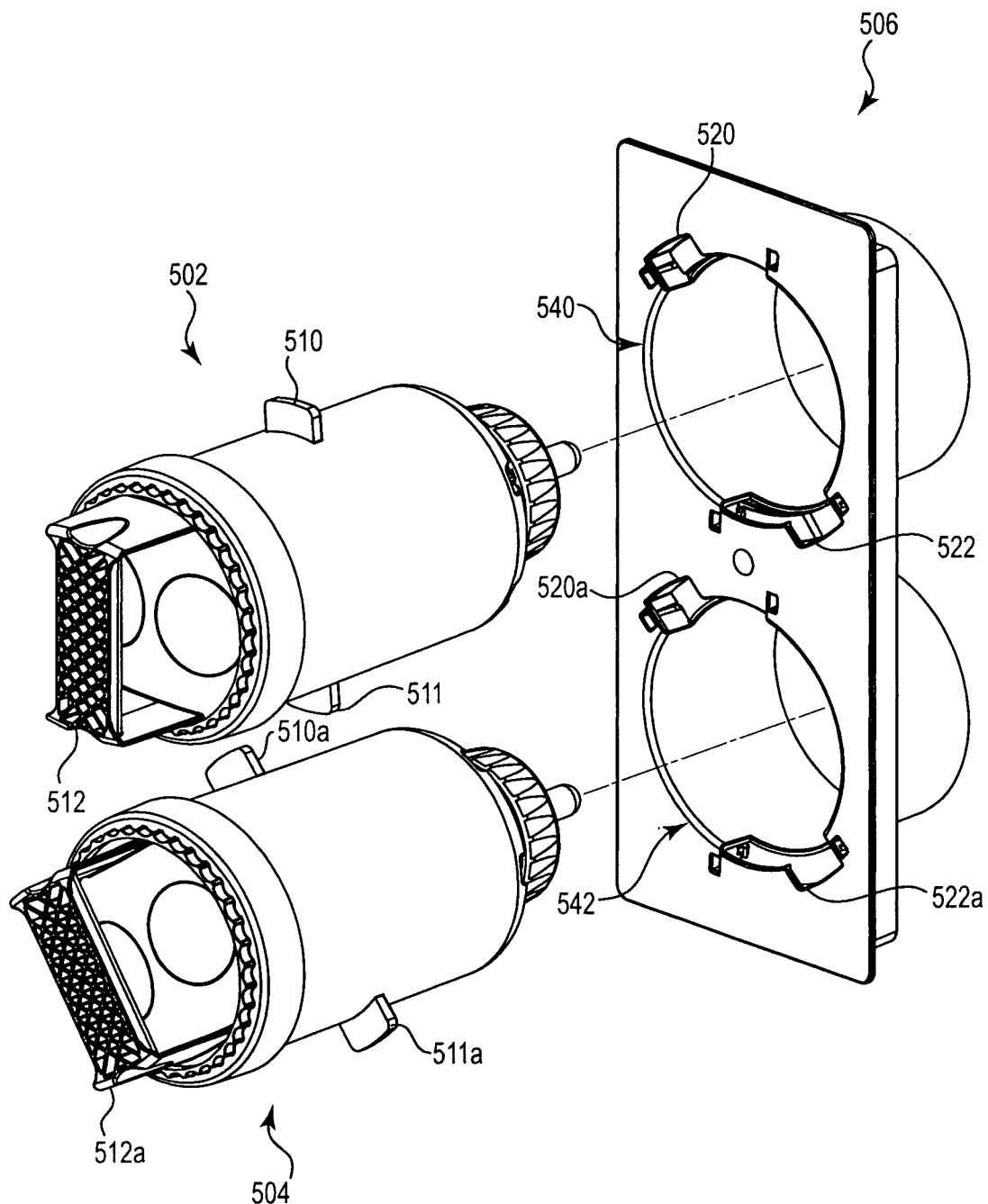
FIG. 23 illustrates a perspective view of one embodiment of two canisters about to be locked in to a receiving panel.

FIG. 23 illustrates a perspective view of one embodiment of two canisters about to be locked into a receiver panel. In operation, receiver panel 506 is positioned on a shelf in a mixing bank. First canister 502 is lined up to be inserted into first opening 540 of receiving panel 506. Using handle 512, locking tabs 510 and 511 are lined up with and pushed into corresponding tab slots 520 and 522. The first canister 502 is simply rotated clockwise to twist lock it into position. Similarly, second canister 504 is lined up to be inserted into first opening 542 of receiving panel 506. Using handle 512*a*, locking tabs 510*a* and 511*a* are lined up with and pushed into corresponding tab slots 520*a* and 522*a*. The second canister 504 is simply rotated clockwise to twist lock it into position, suitable for use in the paint mixing system.

Figure 24:
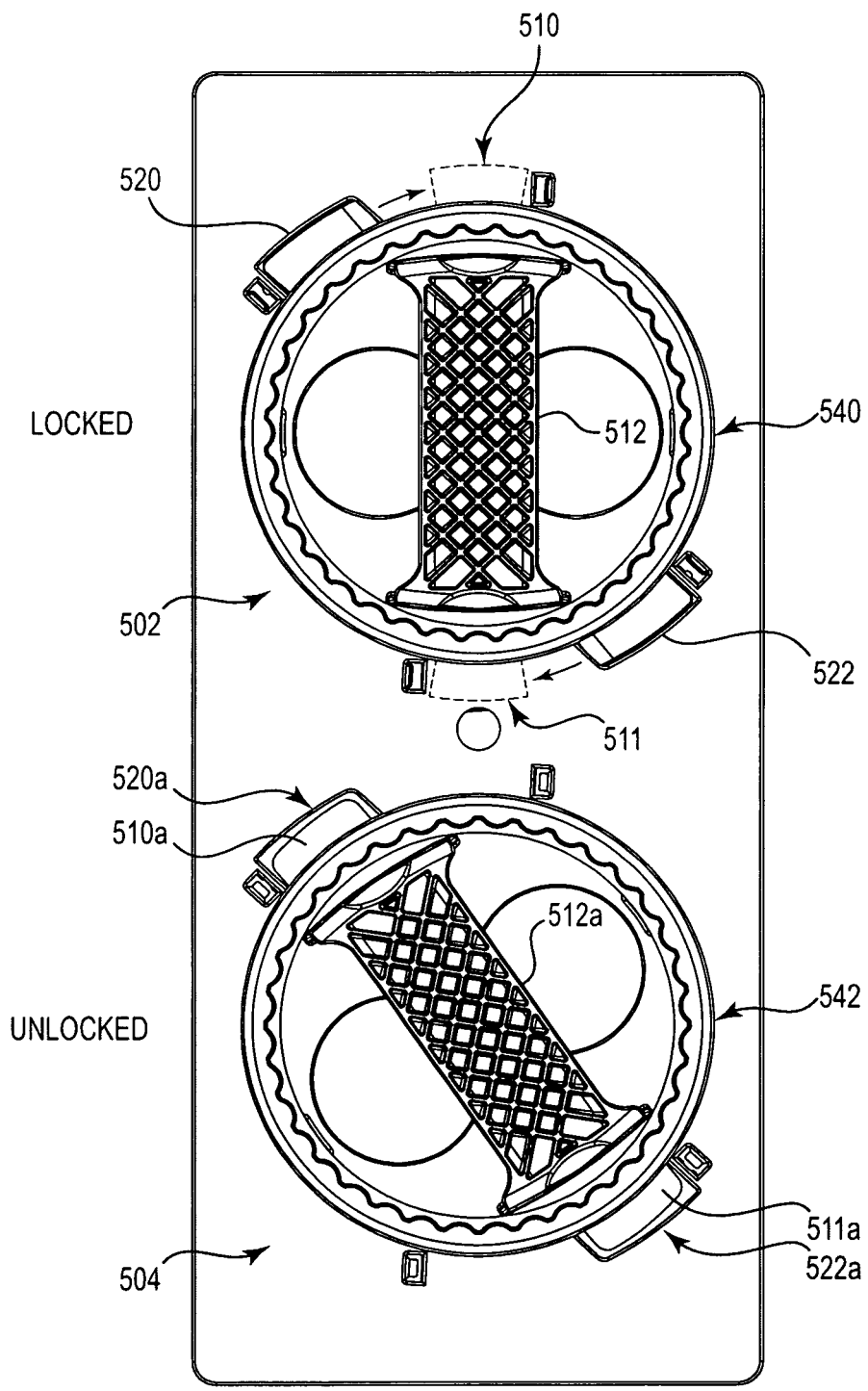
FIG. 24 illustrates top view of a pair of canisters inserted into a receiving panel.

FIG. 24 illustrates top view of a pair of canisters inserted into a receiver panel. First canister 502 is illustrated in a locked position. First canister 502 has been inserted into opening 540, with locking tabs 510, 511 being twist-locked into corresponding tab slots 520 and 522. The position of locking tabs 510 and 511 is illustrated using dashed lines. The locking tabs 510 and 511 are in alignment with the canister handle 512. Second canister 504 is illustrated in an unlocked position. Second canister 504 has been inserted into opening 542, with locking tabs 510*a* and 511*a* being positioned in corresponding tab slots 520*a* and 522*a*. Second canister is in an unlocked position, and can be moved to a locked position by simply using handle 512*a* to push the locking tabs 510*a* and 511*a* further into tab slots 520*a* and 522*a* and rotating the canister in a clockwise direction. The position of locking tabs 510*a* and 511*a* during rotation of the canister is always known, since the handle is aligned with the locking tabs. In other embodiments, the canister handle may not be aligned with the canister locking tabs.

Canisters disclosed herein are used in the paint storing, mixing, dispensing, and tracking systems. The same canister is suitable for use with each system, and as such, avoids many of the problems associated with other paint storing, mixing, dispensing and tracking systems.

Figure 25:
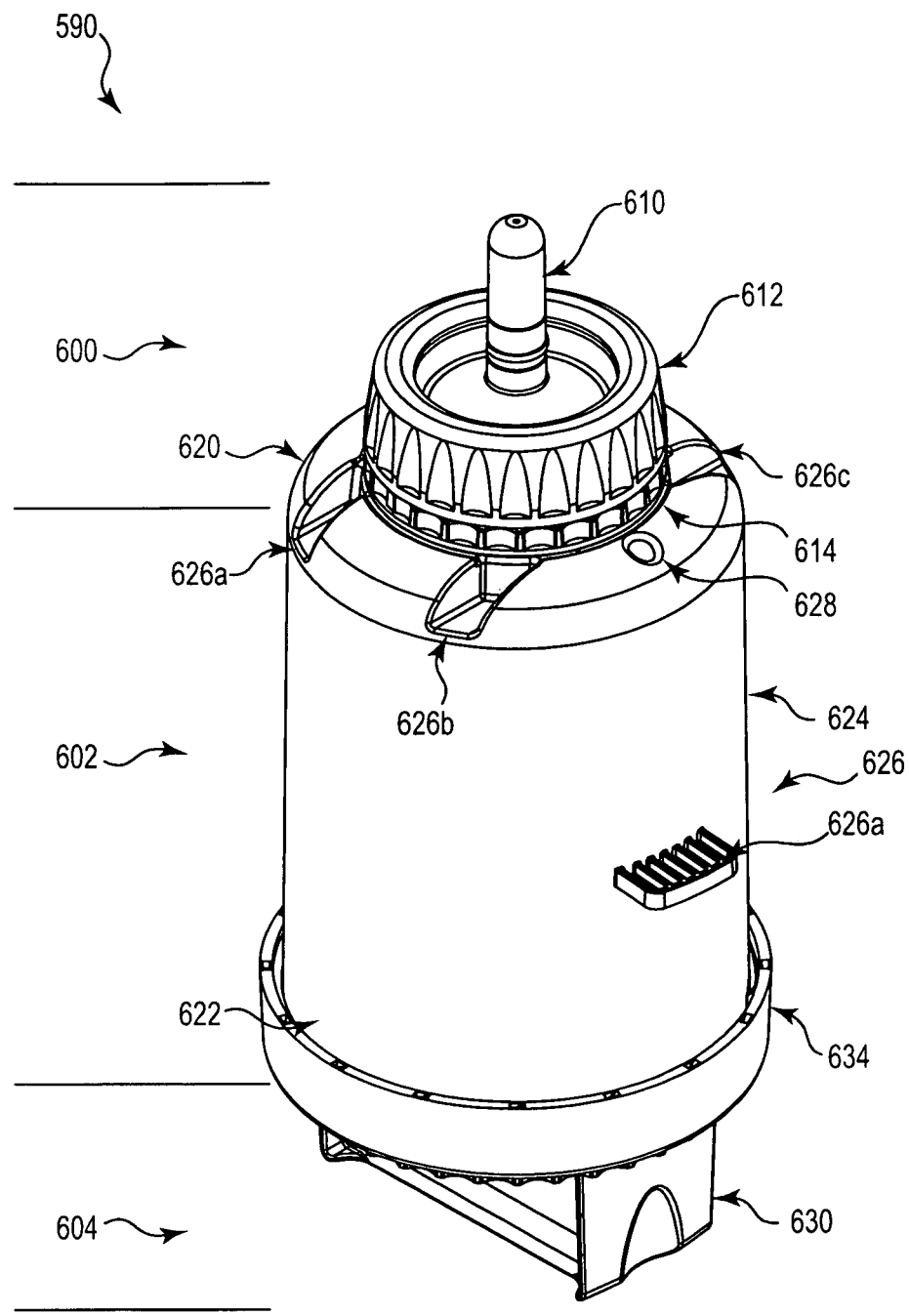
FIG. 25 illustrates a first perspective view of one embodiment of a canister.
Figure 26:
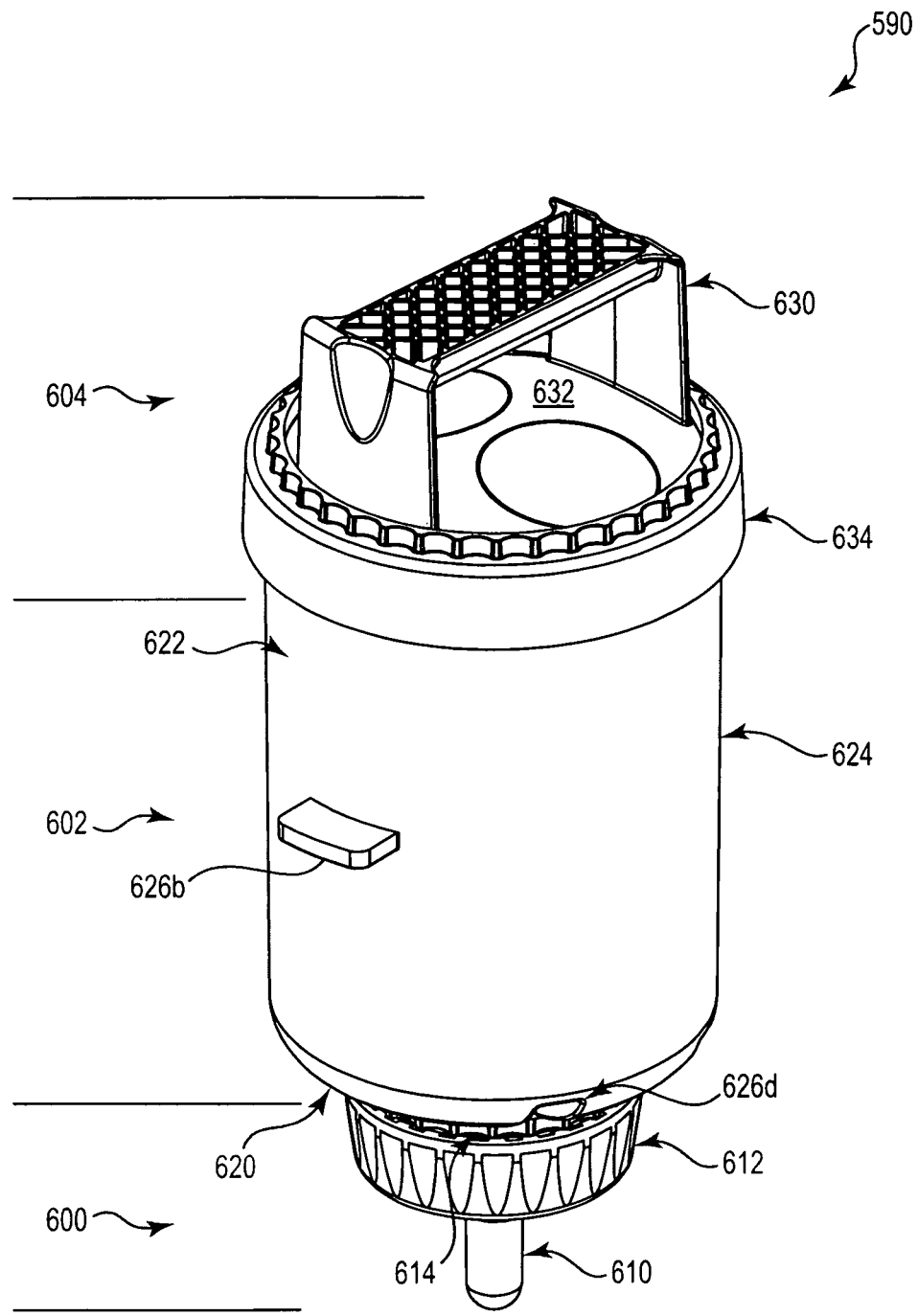
FIG. 26 illustrates a second perspective view of the canister of FIG. 25.

FIG. 25 illustrates a first perspective view of one embodiment of a canister, indicated at 590. Reference is also made to FIG. 26 that illustrates a second perspective view of the canister of FIG. 25. Although this example will be described in a manner similar to canister 502, the canister can be similar to any canister previously described in this specification.

Canister 590 includes a cap assembly 600, a bottle body 602, and handle assembly 604. Cap assembly 600 provides for precise dispensing of paint toners into a container. Cap assembly 600 includes valve assembly 610, cap 612, and jam nut 614. Cap 612 secures valve assembly 610 to bottle body 602. Jam nut 614 holds a bottle neck (not illustrated) in the bottle body 602 when the cap 612 is not secured to the bottle body 602. In operation, cap assembly 600 works with a paint dispenser for dispensing of paint toners contained in canister 590. One example of a paint dispenser suitable for use with canister 590 and cap assembly 600 is described later in this specification.

Bottle body 602 stores fluids, such as paint toners, for dispensing, in a pouch or bladder (not illustrated in this figure) contained therein. In one example, the bottle body 602 is made of a relatively hard polymeric material. In other examples bottle body 602 is made of other materials. Bottle body 602 includes a first end 620, a second end 622, and a generally cylindrical sidewall 624 extending between the first end 620 and the second end 622. First end 620 includes a bottle alignment mechanism 626 for aligning the canister 502 in a dispensing position in a paint dispenser. In one embodiment, the alignment mechanism 626 is in the form of alignment grooves for registration of the canister 590 with a paint dispenser. The alignment grooves include first groove 626*a*, second groove 626*b*, third groove 626*c*, and fourth groove 626*d*. In other embodiments other or additional alignment mechanisms may be used.

Bottle body 620 further includes one or more air ports 628 located at the first end 620. Air ports 628 provide an opening that extends through the bottle body for use in pressurizing the bottle during dispensing of paint toners from the bottle. In one example, the bottle body 602 includes two air ports 628. Air ports 628 are in communication with an interior space of the bottle body between the bottle body sidewall and a bladder (not shown).

Bottle body 620 includes one or more locking tabs 626 (indicated as 626*a*, 626*b*) positioned along the sidewall 624 for positioning, registration, and locking of canister 590 within a paint storage and mixing system. In the embodiment illustrated, bottle body 620 includes locking tabs 626*a* and 626*b* extending from the sidewall 624. In one example, the locking tabs 626*a* and 626*b* are located on opposite sides of sidewall 624 and spaced at a location proximate the midpoint between first end 620 and second end 622, or proximate a midpoint of the canister.

Handle assembly 604 is secured to the second end 622 of bottle body 620. Handle assembly 604 includes a handle 630 having a bottle bottom 632 that includes an alignment slot to assure the handle is always in the same position with respect to the locking tabs, and secures to the second end 622 of bottle body 602. Additionally, handle assembly 604 includes a locking collar 634 that further secures the handle 630 to bottle body 602.

Figure 27:
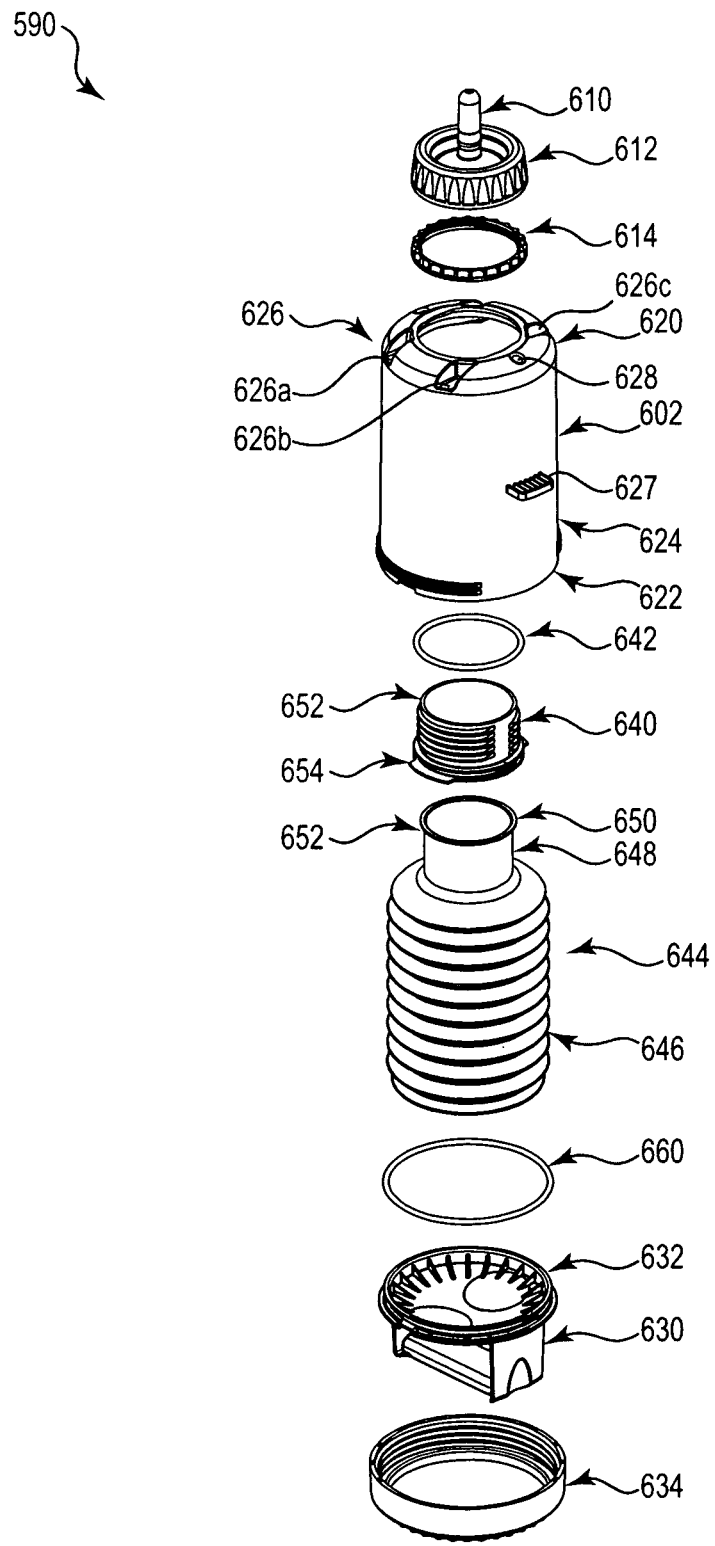
FIG. 27 illustrates an exploded view of one embodiment of the canister of FIG. 25.
Figure 28:
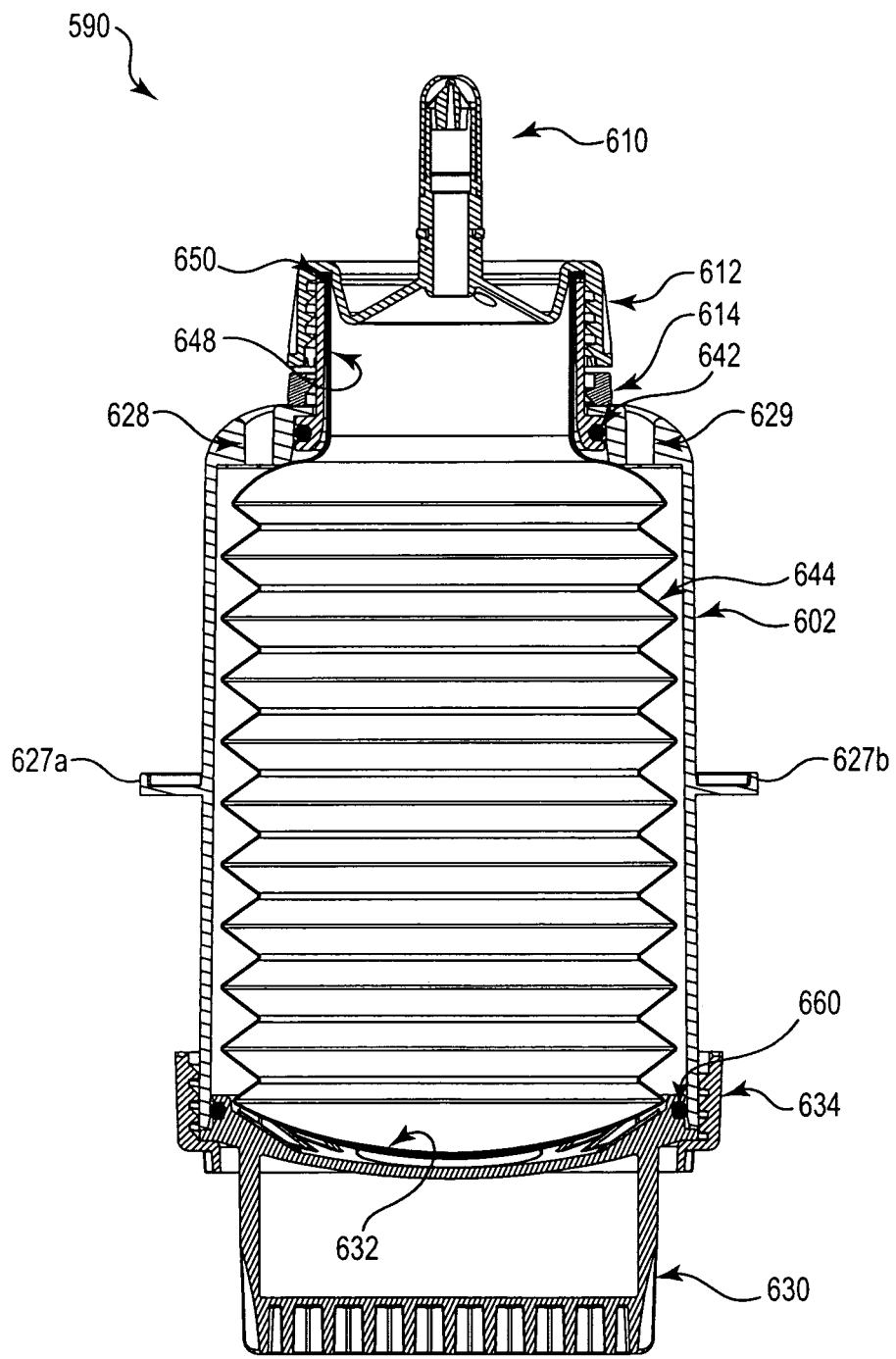
FIG. 28 illustrates one embodiment of a cutaway side view of one embodiment of the canister of FIG. 25.
Figure 29:
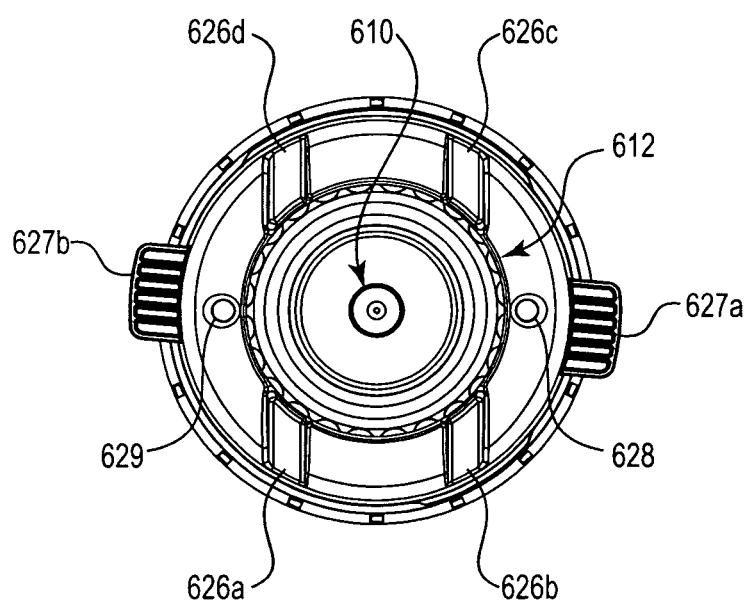
FIG. 29 illustrates an end view of one embodiment of the canister of FIG. 25.

FIG. 27 illustrates an exploded view of one embodiment of the interior and exterior elements of the canister of FIG. 25 and FIG. 26. Reference is also made to FIG. 28 that illustrates one embodiment of a cutaway side view of one embodiment of the canister of FIG. 25, FIG. 26, and FIG. 29 that illustrates an end view of one embodiment of the canister of FIG. 25 and FIG. 26. In summary, FIGS. 28 and 29 illustrate one embodiment of how all of the elements illustrated in the exploded view of FIG. 27 fit and work together.

Cap assembly 600 includes valve assembly 610, cap 612, and jam nut 614. Additionally cap assembly 600 includes a threaded bottle neck 640, and a seal member 642. In one example seal member 642 is an o-ring. A bladder 644 is contained within bottle body 602. Bladder 644 (also known as a bellows or pouch) holds the desired paint toner within canister 590. In one embodiment, bladder 644 includes a bladder body 646 with a bladder neck 648 extending from the bladder body 646. The bladder neck 648 is has a smaller diameter than the bladder body. A lip 650, extending wider than the bladder neck 648, is located at an end of the bladder neck 648.

When assembled for use, the bladder neck 648 can be partially collapsed to fit through the interior of the bottle neck 640. Once expanded back to its original expanded cylindrical shape, the bladder neck 648 fits inside the threaded bottle neck 640, with only lip 650 extending beyond a first end 652 of the bottle neck 640. Seal member 642 is seated about a second end 654 of bottle neck 640, and operates to seal between the bottle neck 640 and a first end 620 of the bottle body 602. Once the bottle neck 640 is positioned on the bladder neck 648, the bladder 644 can be positioned within bottle body 602. Bottle neck 640 extends through the first end 620 of bottle body 602. Jam nut 614 is threaded onto bottle neck 640 and physically holds the bottle neck 640 in the bottle body 602 when cap 612 is not on the bottle neck 640. Cap assembly 600 is threaded onto canister 590 by threading cap 612 onto the first end 652 of bottle neck 640.

Handle 630 includes bottle bottom 632. A seal member 660 is seated on the bottle bottom 632. In one example, seal member 660 is an O-ring. Seal member 660 operates to seal between the bottle bottom 632 and the second end 622 of bottle body 602. Locking collar 634 fits over handle 630, and is threaded onto the second end 622 of the bottle body 602, thereby helping to secure the bottle bottom 632 to bottle body 602.

Figure 30:
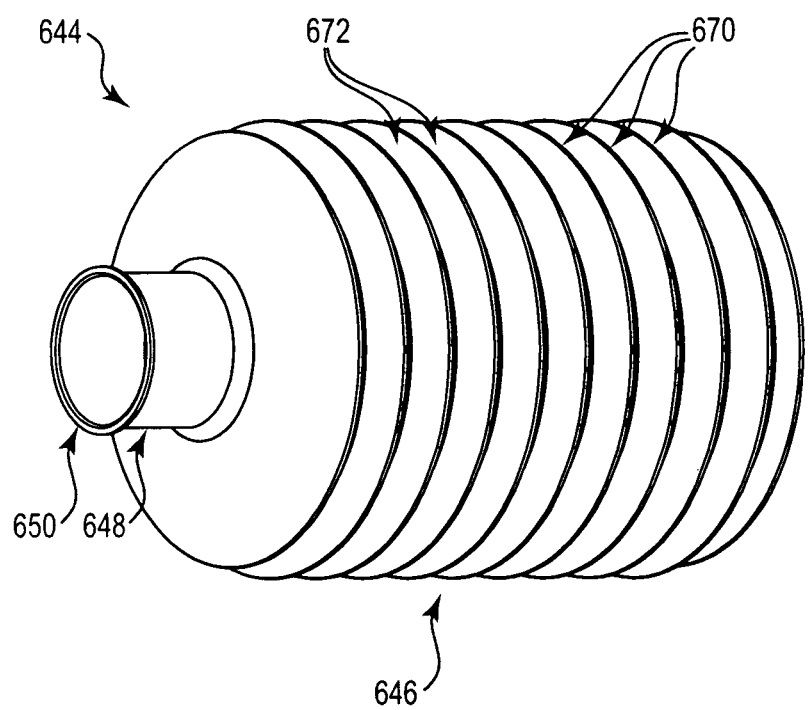
FIG. 30 illustrates a perspective view of one embodiment of a bladder.
Figure 31:
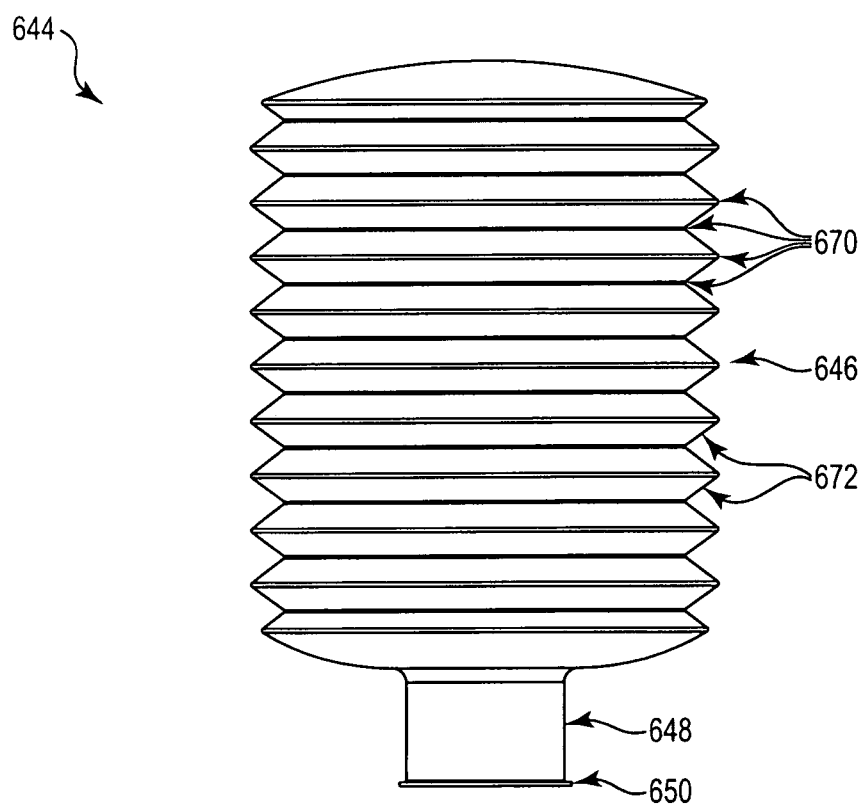
FIG. 31 illustrates a side view of one embodiment of a bladder.

FIG. 30 illustrates a perspective view of one embodiment of bladder 644. FIG. 31 illustrates a side view of one embodiment bladder 644. Bladder 644 includes bladder body 646 and bladder neck 648 having a bladder lip 650. Bladder body 646 includes weakened areas or portions 670 and not weakened areas or portions 672. In use, weakened portions 670 provide for bladder 644 to collapse in a predetermined manner. Based on the design of the bladder 644, including the position of weakened portions 670 at desired locations, the bladder can be collapsed during operation in a predetermined manner that has been defined as being most efficient for the process. In one example, bladder body 646 includes weakened portions 670 such that the bladder body is generally bellows or accordion shaped. Further, when the bladder body 646 is collapsed, it will do so in a very efficient manner from the bottom upward. It is recognized that bladder 644 could have other shapes, other or different weakened areas, or use other methods of collapsing the bladder in a predetermined manner.

Figure 31A:
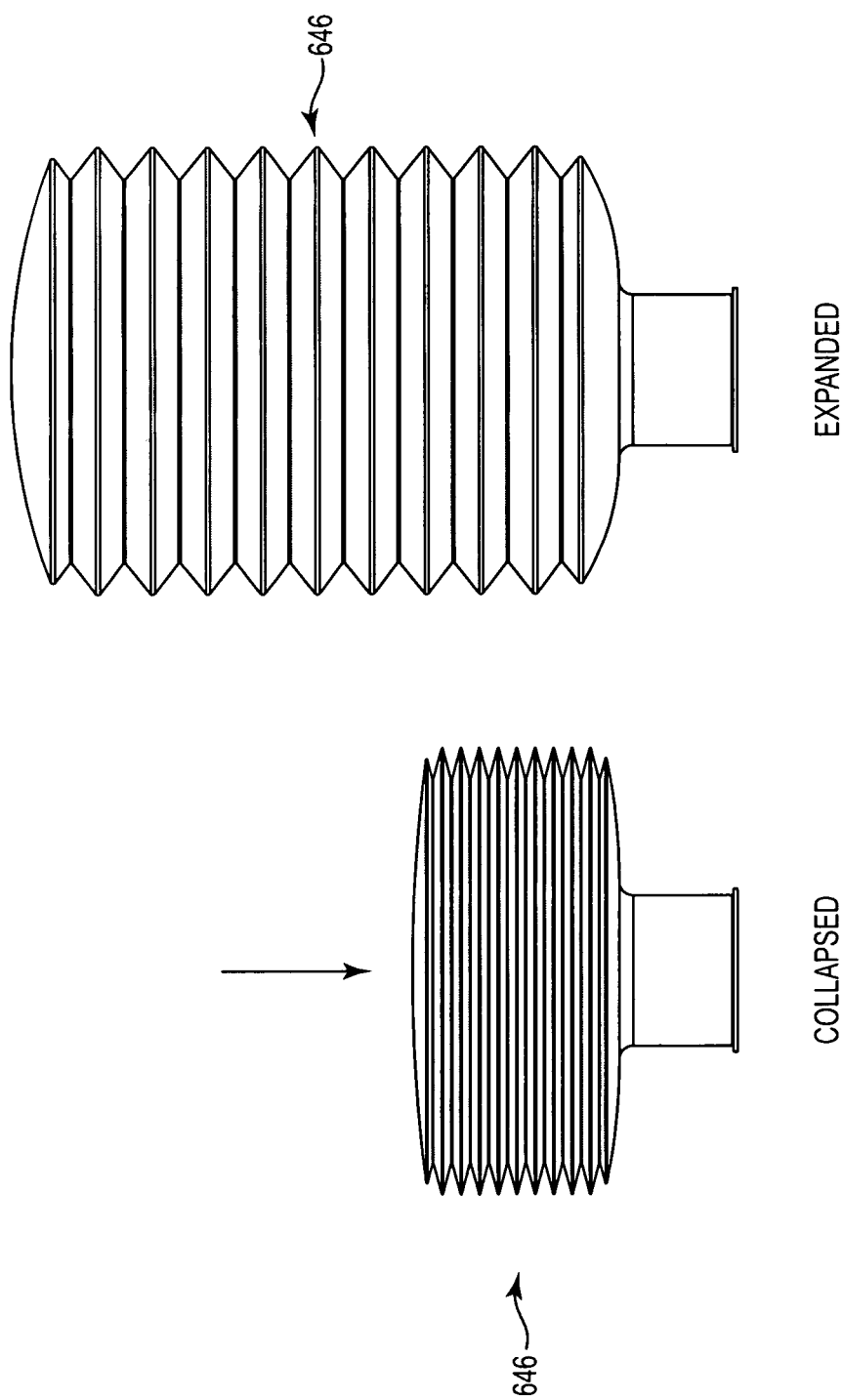
FIG. 31a illustrates one embodiment of a bladder in a predetermined collapsed state and expanded state.

Reference is also made to FIG. 28. In use, canister 590 is positioned in a paint dispenser with paint toner contained in the bladder 644. During dispensing of paint from the canister, pressurized air is brought into the interior of the bottle body 602 via one or more air ports 628, 629. The pressurized air in combination with the design of bladder 644 results in bladder 644 collapsing from the bottom up, in a predetermined efficient manner. FIG. 31a illustrates one embodiment of bladder 644 in a collapsed state and an expanded or non-collapsed state.

Figure 32:
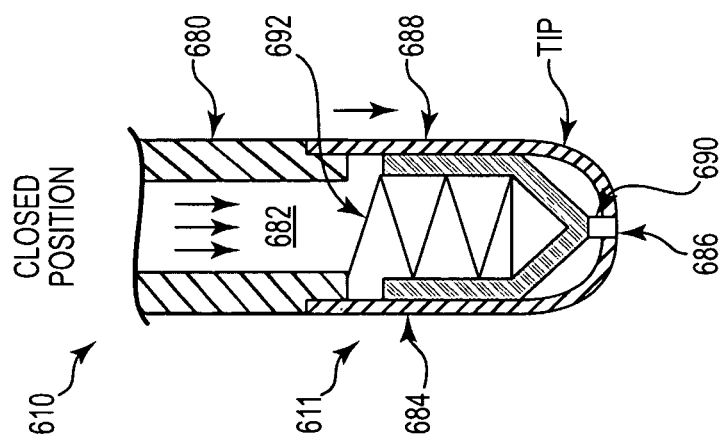
FIG. 32 illustrates one embodiment of a tip assembly.

FIG. 32 illustrates one embodiment of a tip assembly including a valve assembly for use with a canister, indicated as tip assembly 610 and valve assembly 611. In one example, valve assembly 611 is an electro-mechanical valve. Valve assembly 611 is illustrated in a closed position. The valve assembly 611 includes a yoke 680, a fluid area 682, and a thimble shaped tip 684. The yoke 680 is made of a magnetic flow permeable material. The tip 684 is attached to the yoke 680, and made of a non-magnetic material. Further, tip 684 includes an opening 686. A plunger 688 is positioned inside the tip. The plunger is made of a magnetic-flux permeable material. The plunger 688 includes a stopper 690 sized to close opening 686. A spring 692 is positioned in the tip 684 that keeps the plunger 688 in a closed position. In one embodiment, plunger 688 is two pieces, and includes a plastic tip, where in one example the plastic tip is funnel shaped.

Figure 33:
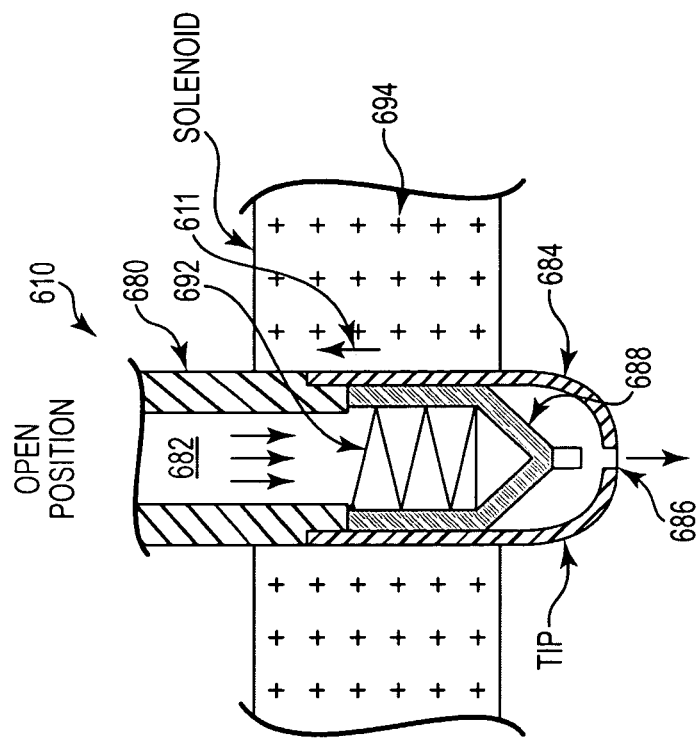
FIG. 33 illustrates another embodiment of a tip assembly.

FIG. 33 illustrates one embodiment of tip assembly 610 including valve assembly 611 in an open position for dispensing fluid in a precise, controlled manner. Paint toner is brought into the fluid area 682 under a relative pressure. The pressure may be an induced pressure or simply by gravity. A cylindrical coil (e.g., a solenoid) 694 is positioned around the valve assembly 611. In operation when electrified, the coil 694 induces a magnetic field in the yoke 680 and the plunger 688, through tip 684. The magnetic field creates an attractive force between yoke 680 and plunger 688. When the attractive force exceeds the strength of spring 692, the plunger 688 moves the stopper 690 away from opening 686 allowing fluid to flow through the opening and exit valve assembly 611. The valve assembly 611 is closed by removing the magnetic field, resulting in the stopper 690 to again cover the tip 684 opening 686. Another embodiment of a tip assembly including a valve assembly suitable for use with the systems in this application is disclosed in U.S. Patent Application Publication No. US 2010/0108723 A1 published May 6, 2010, and incorporated herein by reference.

Figure 34:
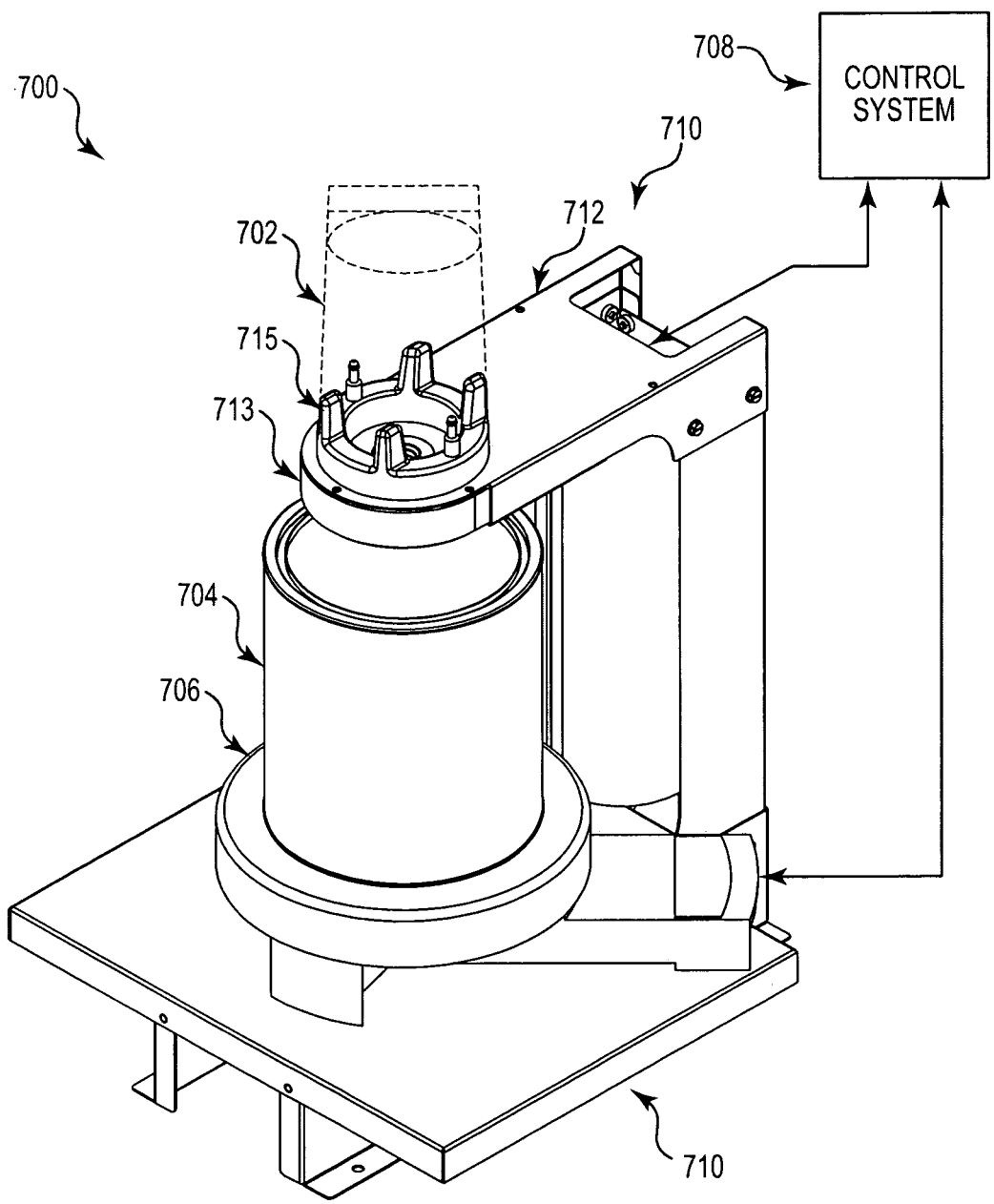
FIG. 34 illustrates one embodiment of a paint dispensing system.

FIGS. 34-44 illustrate one or more embodiments of a paint dispensing system, generally at 700. FIG. 34 illustrates a canister 702 located in a dispensing position for controlled dispensing of fluid contained in the canister 702. A receiving container 704 is positioned on a scale 706. Fluid from the canister 702 is dispensed into the container 704 using the pressurized electro-mechanical dispensing system as described herein. In one embodiment, the dispensing process is a closed loop dispensing process. A reading from the scale 706 is fed back to a dispenser control system 708 that in one example includes a microprocessor based control board. Once a desired amount of fluid is dispensed, the control system 708 ends the dispensing process.

In one embodiment, a container 704 for receiving a desired amount of dispensed fluid (e.g., toner) is place in the scale 706 positioned on a dispenser frame 710. In one example, the container 704 is positioned as close to the canister 702 dispensing orifice as possible. In a dispensing mode, a user can input the desired amount of toner they want dispensed. In one embodiment, a negative dispensing weight is input to achieve a target weight of zero. The control system 708 operates to pressurize the canister 702 bottle. The control system 708 energizes a solenoid assembly 712 solenoid valve to open and dispense fluid. When the desired amount of fluid is dispensed (as determined by the weight scale control feedback signal), the control system operates to close the dispensing valve and no longer pressurize the canister 702 bottle. Canister 702 is then removed and located back in the storage system. A second canister, including a second toner for mixing may now be dispensed into the container 704, or the container 704 may be removed and the toner available for use. Alternatively, a scale control system could be used for energization of the solenoid valve.

Embodiments provide for a two part electromechanical valve system for precise dispensing of fluids, as previously described herein. The valve is located on the tip of the canisters, and the solenoid for actuating the valve is located on the dispensing frame. This design in combination with a pressurized dispensing system provides for precise dispensing of liquids down to a fraction of a drop or gram, or even smaller amounts. The fluid is fired out of the canister tip assembly orifice and drop size cut by actuation of the valve, as opposed to traditional gravity flow.

Figure 35:
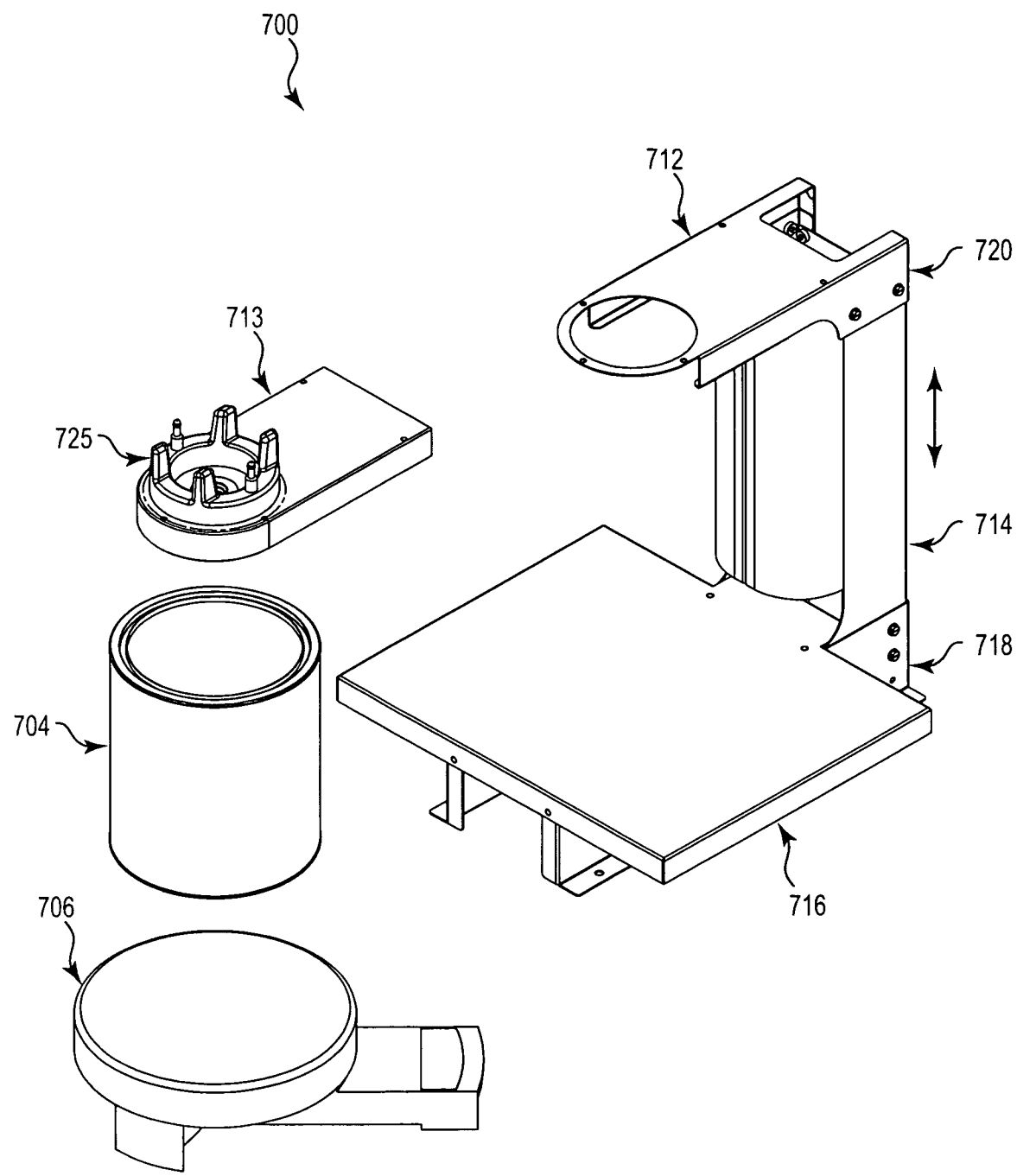
FIG. 35 illustrates an exploded parts view of the paint dispensing system of FIG. 34.

FIG. 35 illustrates an exploded view of one embodiment of the dispenser elements of the dispenser system of FIG. 34. Dispenser system 700 includes dispenser frame 710, having a solenoid receiver 712, adjustable arm 714, and platform or base 716. Adjustable arm 714 includes a first end 718 and a second end 720. Platform 716 is coupled to adjustable arm 714 at first end 718. Solenoid receiver is coupled to adjustable arm 714 at second end 720.

Scale 706 is positioned on platform 716. Container 704 is positioned on the scale 706 during a dispensing operation. Solenoid assembly 713 is positioned in solenoid receiver 712. Canister receiver 715 is operably coupled to solenoid assembly 713, and is configured to receive and align canister 702 with the dispensing system.

Figure 36:
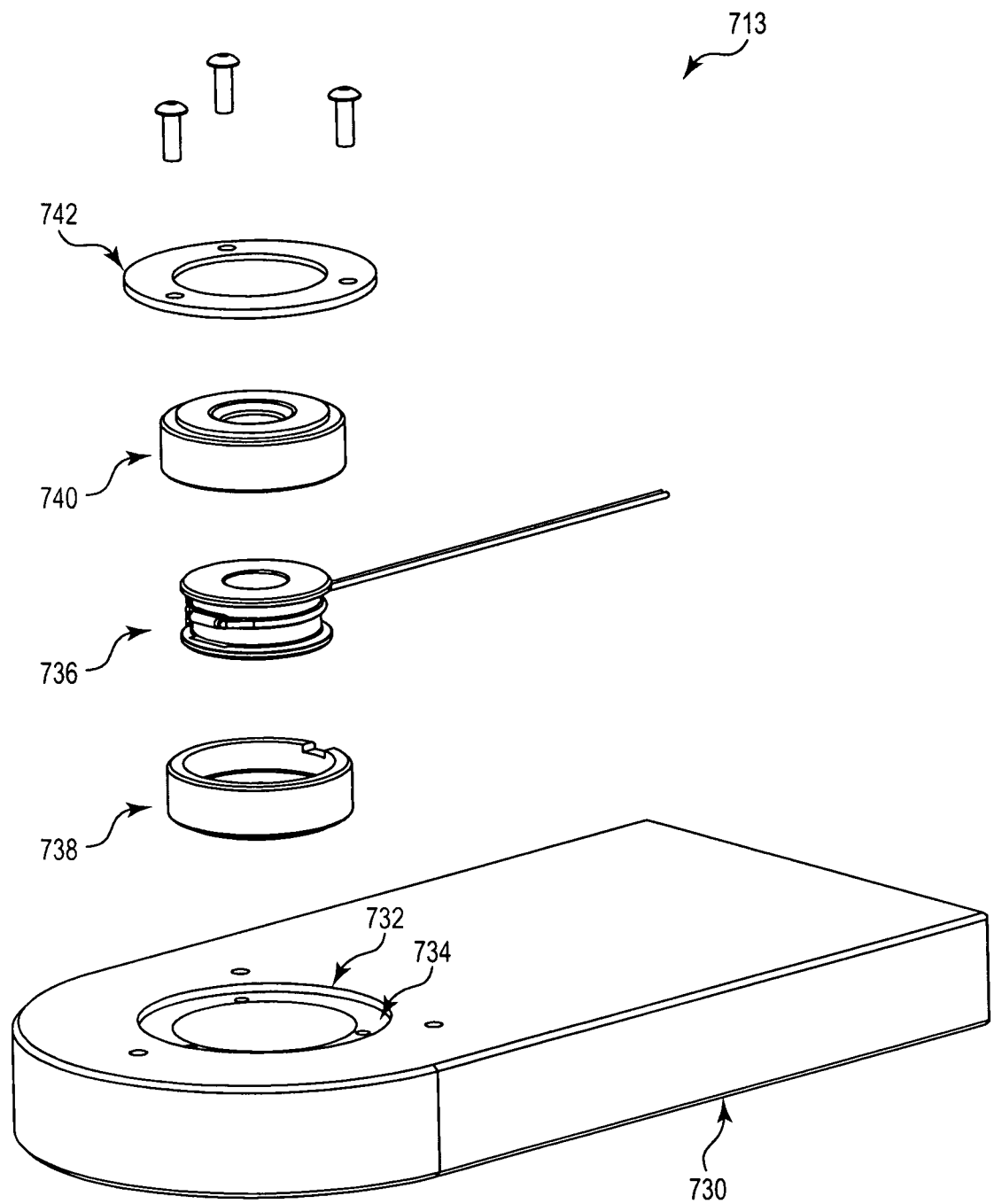
FIG. 36 illustrates an exploded view of one embodiment of a solenoid assembly.

FIG. 36 illustrates an exploded parts view of one embodiment of solenoid assembly 713. Solenoid assembly 713 is suitable for use in environments that need an explosion proof rating, such as a paint room. Solenoid assembly 713 includes a housing 730. In one example, the housing 730 is an explosion proof rated housing. The housing is made of a housing opening or slot 732 that includes a recessed area 734. A solenoid 736 is retained within first bushing 738 and a second bushing 740 to form a donut shaped housing. The solenoid assembly 713 parts 736, 738 and 740 are sized to fit within opening 732. A retention ring 742 is secured within recessed area 734 to secure and maintain the solenoid 736 in place within the solenoid housing 730.

Figure 37:
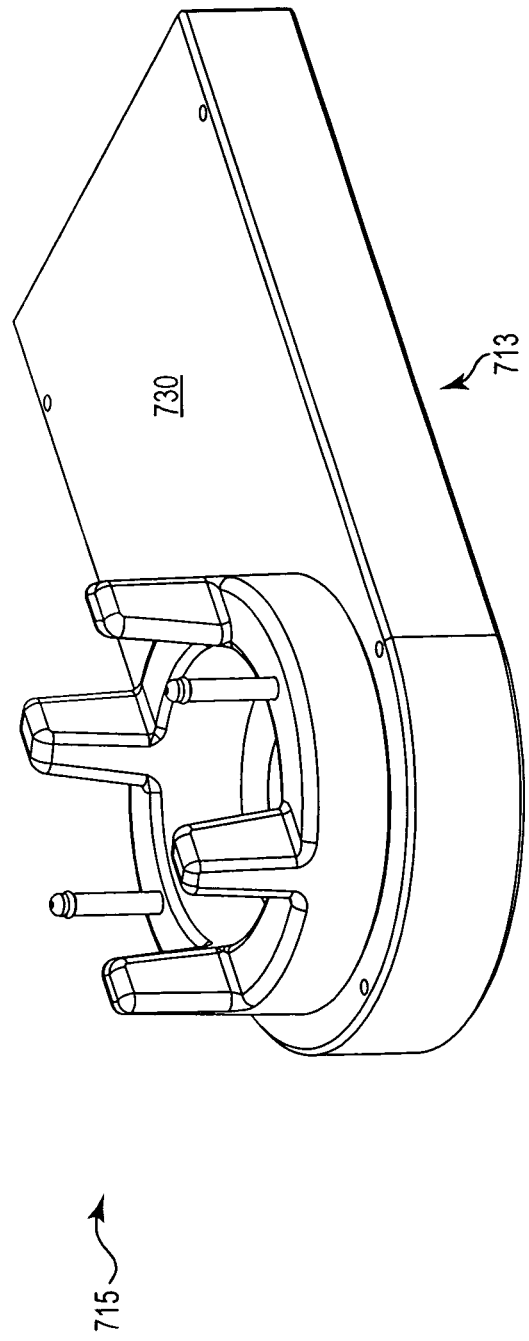
FIG. 37 illustrates a perspective view of one embodiment of a solenoid assembly.
Figure 38:
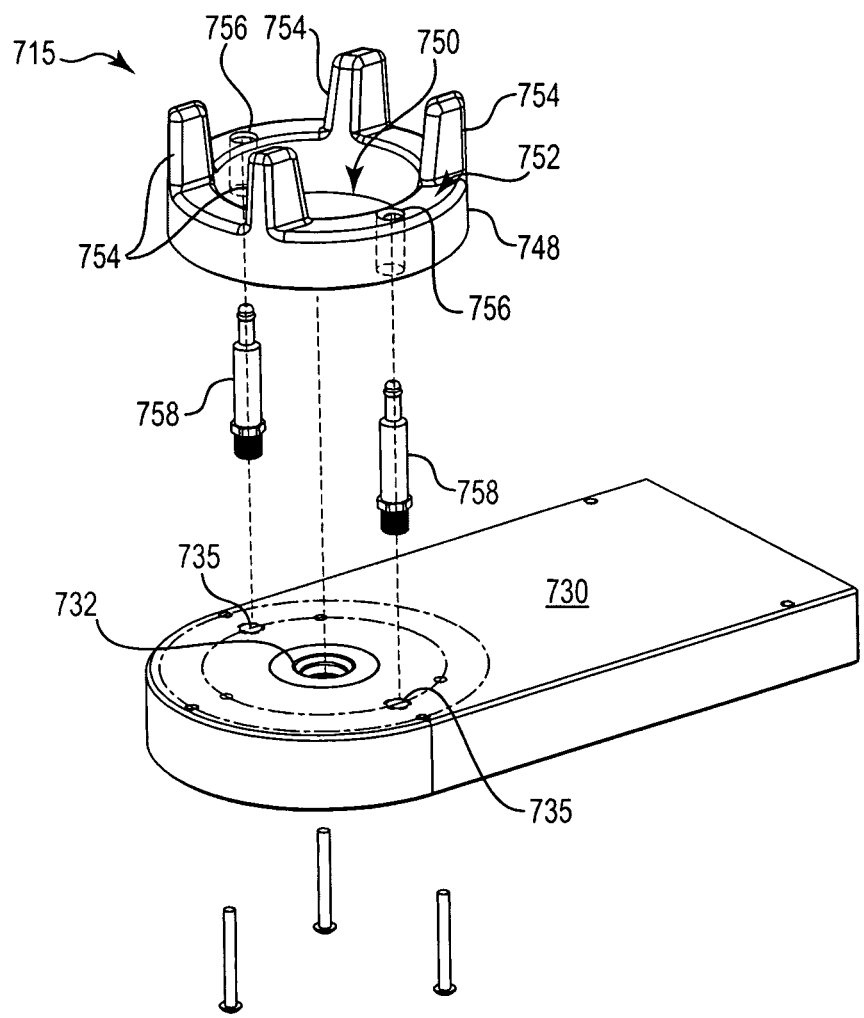
FIG. 38 illustrates an exploded view of the solenoid assembly of FIG. 37.

FIG. 37 illustrates a perspective view of canister receiver 715 positioned over solenoid assembly 713, mounted to solenoid housing 730. FIG. 38 is an exploded elements view of FIG. 37. Canister receiver 715 includes a receiver base 748 that is generally cylindrical shaped and includes a cylindrical shaped sidewall 749 having a central opening 750 extending therethrough and a sidewall top edge 752. Guide or alignment posts 754 extend from top edge 752. Openings 756 extend through sidewall 749 and are sized to receive and contain air stems 758. The air stems 758 communicate with openings 735 in housing 730, and further communicate with an air conduit contained within solenoid assembly 713 for bringing pressurized air through the solenoid housing. The air stems 758 are configured to mate and be received by a corresponding canister positioned on canister receiver 715.

Figure 39:
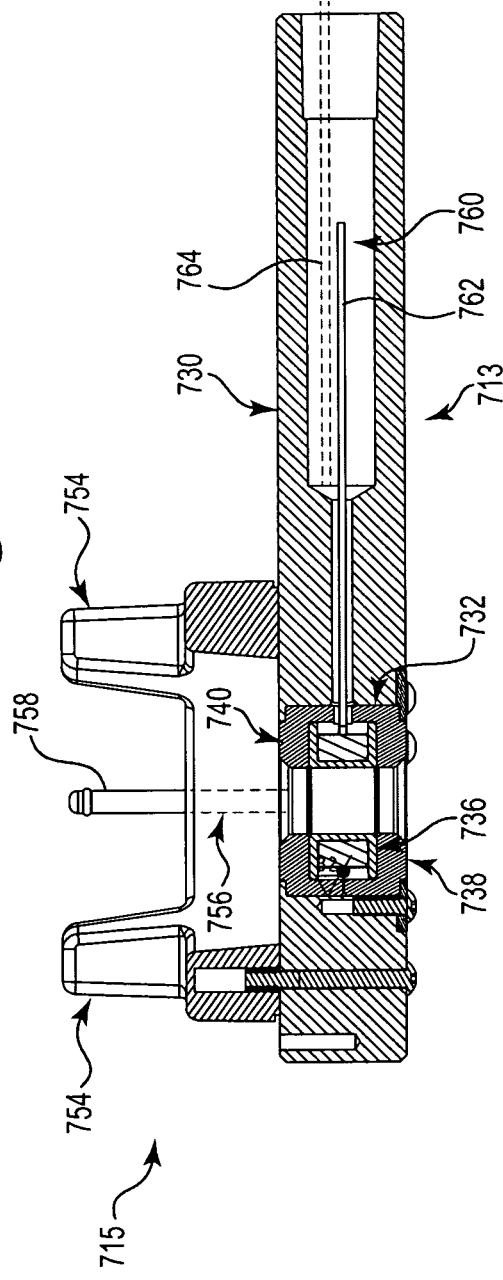
FIG. 39 illustrates a partial cross-section view of one embodiment of a solenoid assembly.

FIG. 39 is a partial cross-sectional view of solenoid assembly 713. Solenoid 736, first bushing 738, and second bushing 740 are positioned within opening 732. Solenoid assembly housing 730 includes an internal chamber or wireway 760, that provides a wireway for solenoid wires 762 to exit the housing 730. Further, an air conduit 764 is provides pressurized air to air stems 758, and ultimately are used to pressurize a canister during a dispensing process. The air conduit 764 may be routed through the same chamber 760 or through a separate space or conduit in housing 730. Receiver central opening 750 is centered over housing opening 732.

Figure 41:
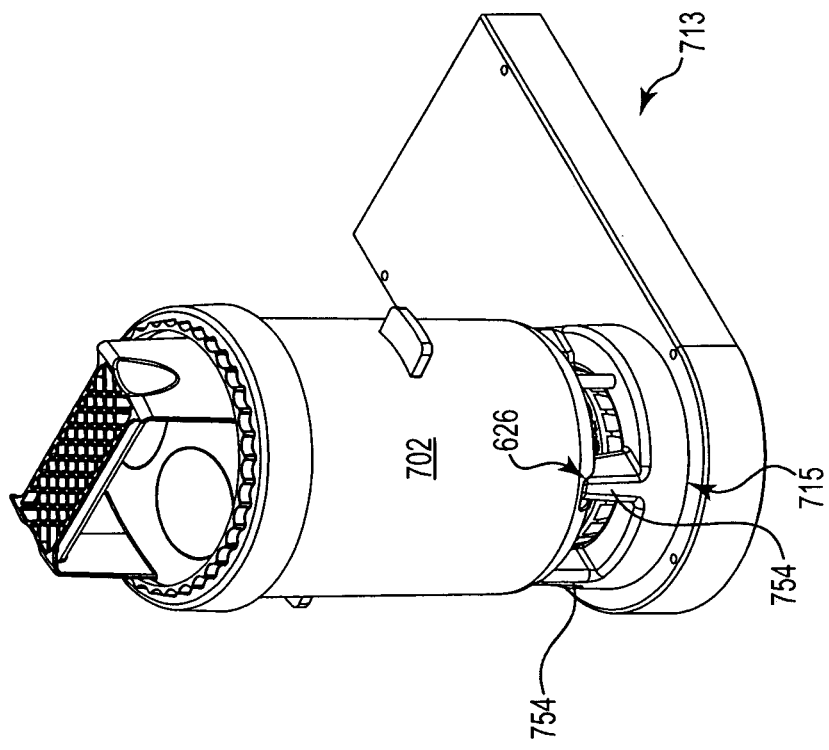
FIG. 41 illustrates a perspective view of one embodiment of a canister positioned on a solenoid assembly in a dispensing position.
Figure 40:
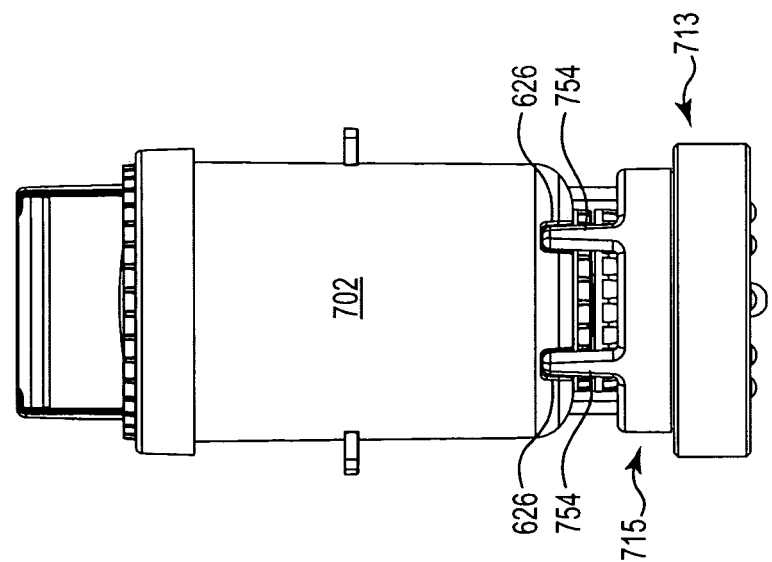
FIG. 40 illustrates a first view of one embodiment of a canister positioned on a solenoid assembly in a dispensing position.

FIG. 40 and FIG. 41 illustrate a front and perspective view of a canister 702 positioned on a dispensing system. Canister 702 is registered an aligned with solenoid assembly 713 via receiver 715. In one example, canister alignment mechanism 626 (shown as grooves) are configured to receive the receiver alignment posts 754, to position and maintain canister 702 on dispensing system 700.

Figure 42:
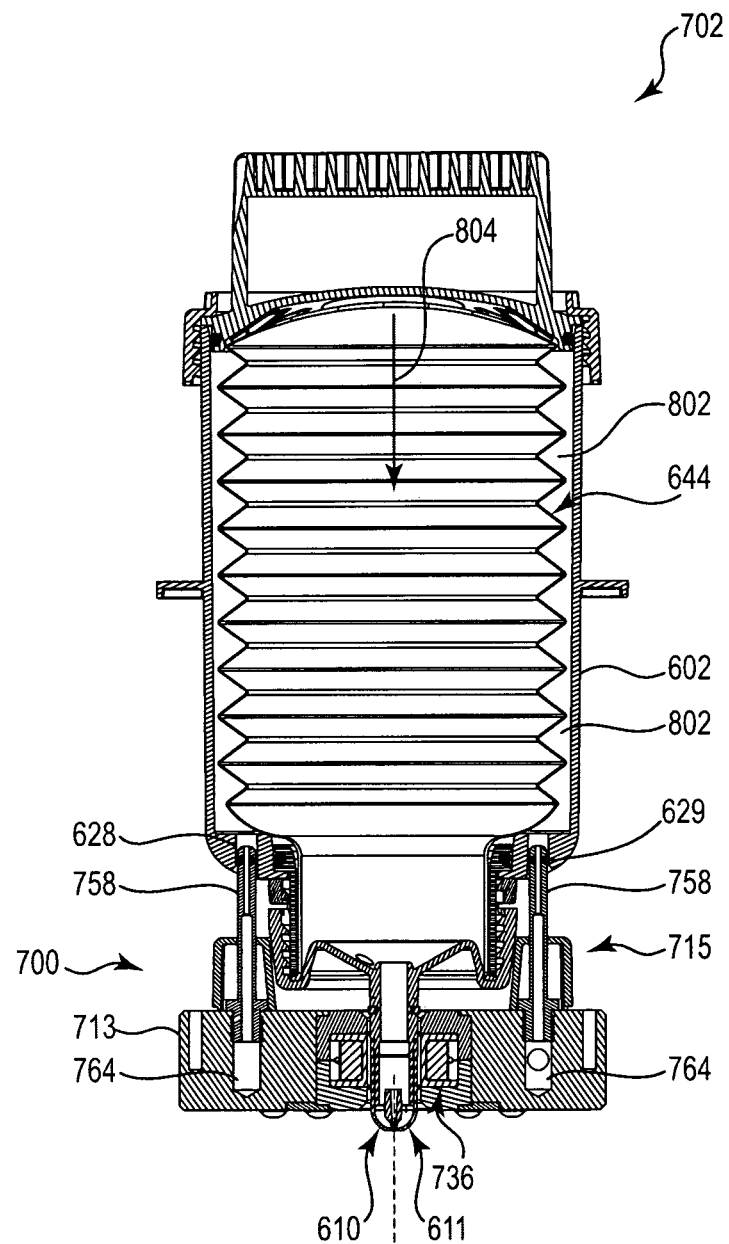
FIG. 42 illustrates a cross-section view of one embodiment of a canister positioned on a solenoid assembly in a dispensing position.

FIG. 42 illustrates a partial sectional view of a canister positioned on a dispensing system solenoid assembly. Canister 702 is similar to the canisters previously detailed herein. Canister 702 is positioned on dispensing system 700 by positioning and aligning the canister 702 on solenoid assembly 713 via receiver 715. The canister tip assembly 610 is inserted through the opening 732 such that solenoid 736 is positioned around tip assembly 610. Solenoid assembly 713 can now be controlled (i.e., energized) to control the dispensing valve 611 in tip assembly 610, to control the dispensing of fluid therethrough.

Air stems 758 are aligned and inserted in canister air port 628 and air port 629, allowing pressurized air to be transported to canister 702 through the solenoid assembly 713 and receiver 715. During a dispensing operation, positive air flow pressure is provided to internal space 802 located between the bottle body 602 and bladder 644, to aid in the dispensing of fluid from the bladder and the collapsing of the bladder in a controlled manner. Due to the bladder weakened areas, the bladder will collapsed in a predetermined manner. In one example, the bladder collapsed in from the canister bottom towards the tip assembly, indicated by arrow 804.

Figure 43:
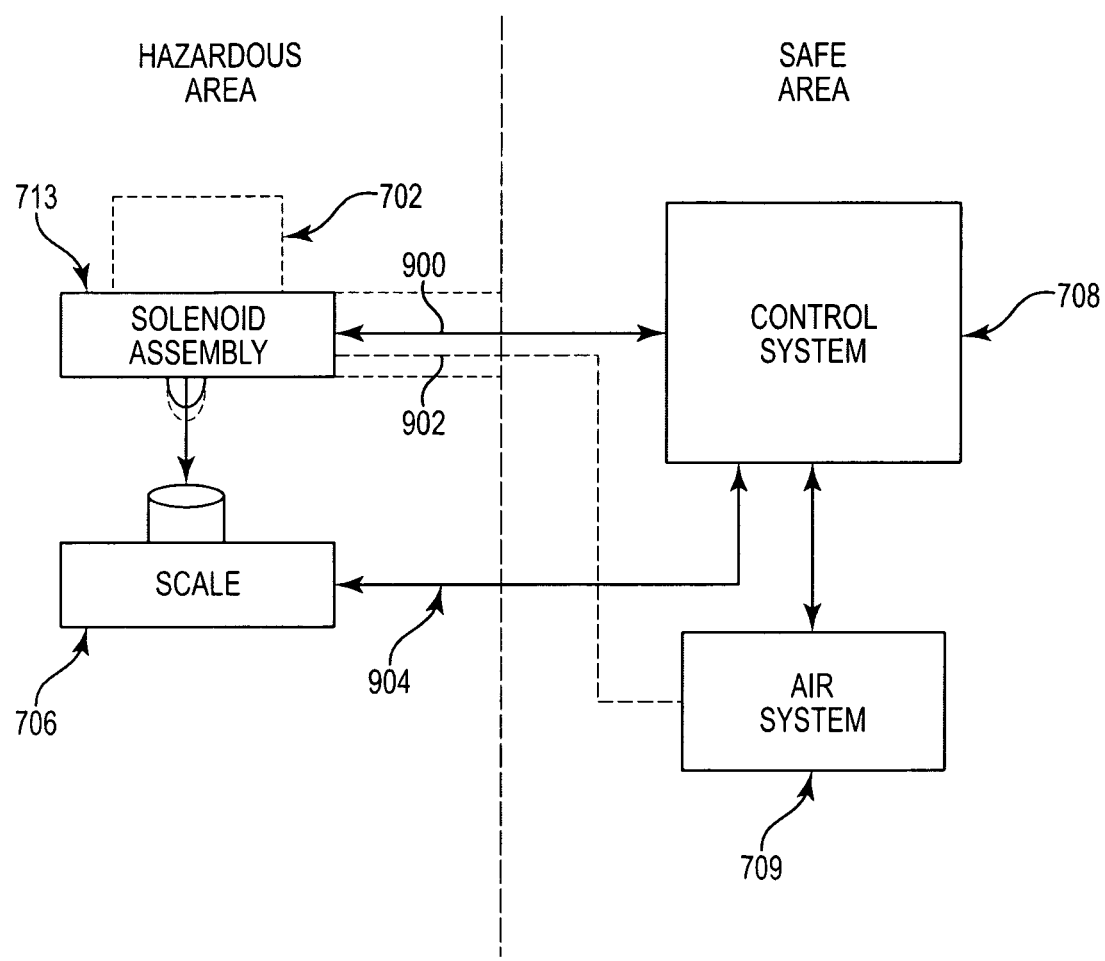
FIG. 43 illustrates a block diagram of one embodiment of a paint dispensing system.

FIG. 43 is a block diagram illustrating one embodiment of how the dispensing system is able to operate in a hazardous rated environment (e.g., an environment that requires an explosion-proof rating). The paint dispensing system solenoid assembly 713 and scale 706 are located in a hazardous rated area. Control system 708 and air system 709 are located in a safe or non-hazardous area. Control wiring for operation of the dispensing valve in the tip assembly is safely brought to the solenoid through the explosion-proof housing of the solenoid assembly, indicated at 900. Pressurized air is also brought to canister 702 from air system 709 located in a safe area, through the solenoid housing, indicated at 902. In a similar manner, scale wiring signals are brought from scale 706 located in the hazardous area, to the control system 708 located in the safe area.

Figure 44:
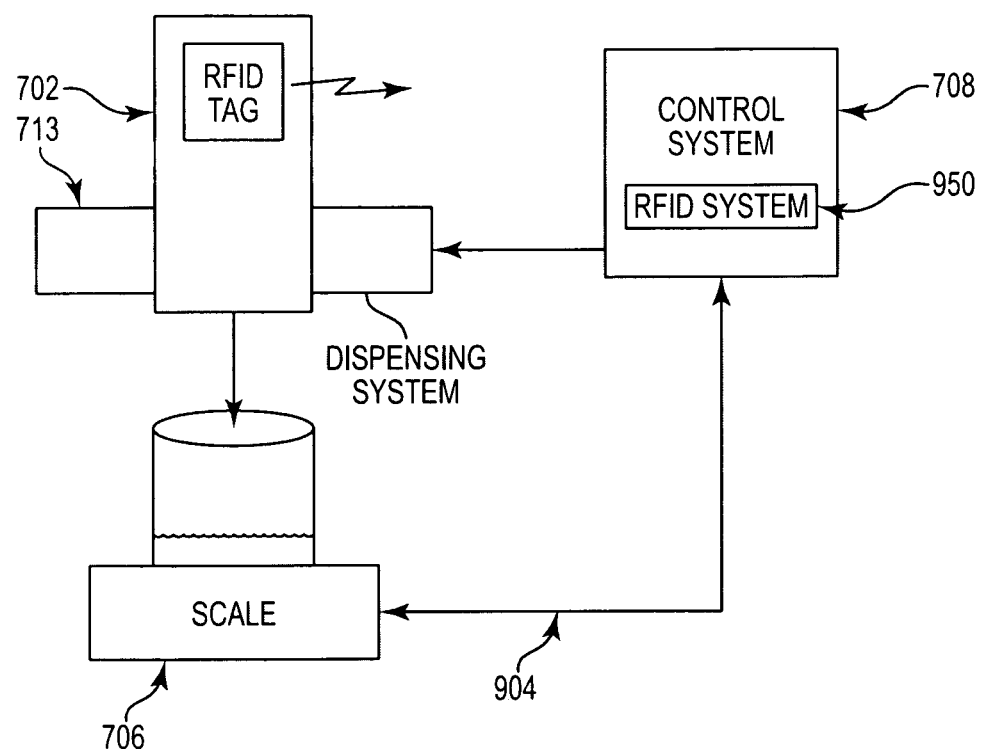
FIG. 44 illustrates a block diagram of one embodiment of a paint dispensing system including a tracking system.

FIG. 44 illustrates one or more embodiments of a control system 708 for use with a dispensing system. In one embodiment, the system 708 includes a tracking system 950 for tracking toner use for each canister. In one embodiment, the system 950 is an RFID system. Each canister has a unique RFID tag 952. The RFID tag 952 is physically located on the canister. In one embodiment, the RFID tag 952 is located on the canister registration system or bottle cap. The RFID tag communicates and initializes with the control system 708 RFID system 950 every time fluid is dispensed from the canister. The amount of fluid contained in each canister is tracked, including the amount of toner dispensed from a specific canister during a dispensing operation. In one embodiment, the amount dispensed is tracked using the feedback signal 904 from the scale 706 during a dispensing operation. The amount dispensed can be tracked using different methods, such as using the amount requested by the user to be dispensed from the canister. The RFID system 950 communicates with the RFID tags (e.g., RFID tag 952) located on each canister, the paint dispensing control system or an external control system to track the amount of fluid available for use in each canister.

The present embodiments are suitable for use for storing, mixing, dispensing and tracking toners used for painting in the automotive industry. The present embodiments may also be used for other commercial or industrial applications, such as mixtures of dry goods, adhesives, fluids, etc. In one embodiment, one or more of the present embodiments are used for dispensing fluids in the medical industry.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A paint storing and mixing system comprising:
    a receiving assembly disposed within a housing, the receiving assembly rotatable relative to and entirely within the housing about a longitudinally extending axis of rotation, the receiving assembly including a plurality of receiver cells;
    a plurality of paint canisters positioned within the receiver cells, each paint canister including a first end, a second end, and a sidewall extending between the first end and the second end and where each paint canister is removably secured to the receiving assembly such that the paint canisters each have the sidewall generally orthogonal to the longitudinally extending axis of rotation;
    the plurality of paint canisters including a first paint canister having a first paint canister sidewall where the longitudinally extending axis of rotation passes through the first paint canister sidewall, and a second paint canister having a second paint canister sidewall, where the longitudinally extending axis of rotation is adjacent to the second paint canister sidewall, and where the first paint canister is larger than the second paint canister; and
    an electronic control system operably coupled to the receiving assembly that rotates the receiving assembly about the longitudinally extending axis of rotation according to a selected one of a number of programmable modes based on a number of predefined factors including at least one of a speed of rotation, a frequency of rotation, an amount of rotation, a direction of rotations, and a mixing formula of paint contained in the canisters.

2. The system of claim 1, where the control system operates to move the receiving assembly in an agitation mode or in a presentation mode.

3. The system of claim 1, where the control system includes an actuation mechanism comprising a gear assembly mechanically coupled to a drive.

4. The system of claim 3, where the actuation mechanism includes one of a hydraulic actuator, pneumatic actuator, or a motor.

5. A paint mixing and storage system comprising:
    a first shelf comprising:
        a first housing; and
        a first receiving assembly disposed within the first housing and rotatable relative to and entirely within the first housing about a longitudinally extending first axis of rotation;
        a first plurality of paint canisters positioned within the first receiving assembly, each paint canister including a first end, a second end, and a sidewall extending between the first end and the second end; and wherein the first receiving assembly includes a first plurality of receiver panels, each receiver panel having at least one opening to receive a paint canister of the first plurality of paint canisters and to selectively secure to a perimeter of the sidewall of the paint canister, the first receiving assembly storing each paint canister of the first plurality of paint canisters in a position where the paint canisters each have a sidewall generally orthogonal to the longitudinally extending first axis of rotation, where a receiver panel having a single opening to receive the paint canister holds the paint canister in a position where the first axis of rotation extends through the center of the paint canister; and
    a second shelf stacked on the first shelf, the second shelf including a second housing and a second receiving assembly the same as the first receiving assembly disposed within the second housing and rotatable within the second housing about a longitudinally extending second axis of rotation in parallel with and different from the first axis of rotation, the second receiving assembly including a second plurality of receiver panels storing a second plurality of paint canisters, the second shelf stacked on the first shelf via the second housing being stacked on the first housing.

6. The system of claim 5, comprising:
    an actuation mechanism that rotates the first receiving assembly about the longitudinally extending first axis of rotation, and rotates the second receiving assembly about the longitudinally extending second axis of rotation.

7. The system of claim 6, the actuation mechanism including a drive coupled to a gear assembly, the gear assembly rotatably coupled to the first receiving assembly and the second receiving assembly.

8. The system of claim 7, the second shelf including a second gear assembly coupled to the second receiving assembly having the second plurality of canisters positioned therein, the second gear assembly being mechanically coupled to the first gear assembly.

9. The system of claim 5, the second plurality of paint canisters positioned within the second receiving assembly, each paint canister including a first end, a second end, and a sidewall extending between the first end and the second end; and with each receiver panel of the second plurality of receiver panels having at least one opening to receive a paint canister of the second plurality of paint canisters and to selectively secure to a perimeter of the sidewall of the paint canister, the second plurality of paint canisters each have the sidewall length generally orthogonal to the second longitudinal axis of rotation, where a receiver panel having a single opening to receive a paint canister holds the paint canister in a position where the second axis of rotation extends through the center of the paint canister,
    where the second plurality of paint canisters are positioned within the second plurality of receiver panels.

10. The system of claim 5, where the first plurality of paint canisters includes a first paint canister larger than a second paint canister.

* * * * *